(12) United States Patent
Campbell, III et al.

(10) Patent No.: US 8,994,771 B2
(45) Date of Patent: *Mar. 31, 2015

(54) VIDEO PHONE KIOSK WITH ATTRACTOR AND PROXIMITY SENSING

(75) Inventors: Robert Campbell, III, Durango, CO (US); Paul S. Penrod, Longmont, CO (US)

(73) Assignee: Investors Enterprises LLC, Durango, CO (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/564,509

(22) Filed: Aug. 1, 2012

(65) Prior Publication Data

US 2012/0293598 A1    Nov. 22, 2012

Related U.S. Application Data

(63) Continuation of application No. 12/114,151, filed on May 2, 2008, now Pat. No. 8,259,153.

(60) Provisional application No. 60/916,169, filed on May 4, 2007.

(51) Int. Cl.
*H04N 7/14* (2006.01)
*G06Q 30/02* (2012.01)

(52) U.S. Cl.
CPC ............... *H04N 7/147* (2013.01); *G06Q 30/02* (2013.01); *H04N 7/142* (2013.01)

USPC ................. 348/14.01; 348/14.03; 348/14.04; 348/14.08

(58) Field of Classification Search
USPC ..................... 348/14.01–14.05, 14.07–14.08, 348/14.11–14.12, 25
See application file for complete search history.

(56) References Cited

U.S. PATENT DOCUMENTS 8,063,929 B2    11/2011  Kurtz

FOREIGN PATENT DOCUMENTS

WO     WO 99/57900     11/1999

*Primary Examiner* — Suhan Ni
(74) *Attorney, Agent, or Firm* — Oppedahl Patent Law Firm LLC

(57) ABSTRACT

A Video Phone Kiosk system for providing audio and video phone calls, video mail, greeting cards, and custom, targeted, income generating advertising as well as establishing a platform for the deployment of additional pay and enhanced services that can be added to the video phone kiosk or customize with expanded service delivery of the video phone kiosk to address specific vertical markets, such as senior citizens, shopping, cultural, social, travel, medical, financial and investments. The advantage over public pay phones and kiosks lies in the fact that the video phone kiosk can generate income on a near continuous basis through the use of additional non-telephony specific pay services and an attractor that displays forms of advertising and entertainment which can be updated remotely and targeted to specific market or demographic.

16 Claims, 26 Drawing Sheets

TOP VIEW OF VIDEO PHONE KIOSK WITH ROUND ATTRACTOR DISPLAY AND SENSOR MAT

TOP VIEW OF VIDEO PHONE KIOSK WITH ROUND ATTRACTOR DISPLAY AND SENSOR MAT

TOP VIEW OF VIDEO PHONE KIOSK WITH ROUND ATTRACTOR DISPLAY AND PROXIMITY SENSORS

TOP VIEW OF VIDEO PHONE KIOSK WITH FLAT ATTRACTOR DISPLAY AND SENSOR MAT

TOP VIEW OF VIDEO PHONE KIOSK WITH FLAT ATTRACTOR DISPLAY AND PROXIMITY SENSORS

FRONT VIEW OF VIDEO PHONE KIOSK WITH ROUND ATTRACTOR DISPLAY AND PROXIMITY SENSORS

FRONT VIEW OF VIDEO PHONE KIOSK WITH FLAT ATTRACTOR DISPLAY AND SENSOR MAT

FRONT VIEW OF VIDEO PHONE KIOSK WITH FLAT ATTRACTOR DISPLAY AND PROXIMITY SENSORS

TOP LEVEL PROCESS LOOP

PAYMENT CARD CAPTURE PROCESS

RATE TABLE PROCESS

VIDEO CALL PROCESS LOOP

VIDEO MAIL PROCESS LOOP

GREETING CARD PROCESS LOOP

REMOTE AND CONTENT MANAGEMENT
FOR VIDEO PHONE KIOSKS

INITIALIZE VIDEO PHONE KIOSK PROCESS

VIDEO PHONE KIOSK MAINTENANCE MODE PROCESS

PAYMENT CARD PROCESS

FRONT VIEW OF THE EXPANDED SERVICES KIOSK

BIOMETRIC KEYBOARD

TOP VIEW OF VIDEO PHONE KIOSK WITH ATTRACTOR
WING DISPLAY AND SENSOR MAT

TOP VIEW OF VIDEO PHONE KIOSK WITH ATTRACTOR WING DISPLAY AND PROXIMITY SENSORS

FRONT VIEW OF VIDEO PHONE KIOSK WITH ATTRACTOR WING DISPLAY AND SENSOR MAT

FRONT VIEW OF VIDEO PHONE KIOSK WITH ATTRACTOR WING DISPLAY AND PROXIMITY SENSORS

VIDEO PHONE KIOSK WITH ATTRACTOR AND PROXIMITY SENSING

CROSS REFERENCE APPLICATIONS

This application is a continuation of prior application Ser. No. 12/114,151, filed May 2, 2008, which claims the benefit of U.S. Provisional Application No. 60/916,169 filed May 4, 2007, each of which are incorporated by reference herein for all purposes.

FIELD OF INVENTION

The present invention relates to public pay telephones and kiosks, specifically to phone kiosks that are used in public places to provide audio only phone calls and possibly an Internet connection for pay for data services.

BACKGROUND OF THE INVENTION

A problem that exists with currently deployed public pay phones is that these devices do not generate money for the owner/operator when the phones are not in use. To make up this shortcoming, an owner of a public pay phone will try and place a quantity of these devices in high traffic areas where the percentage of use in any time period will be higher than in places where large numbers of people do not go. Additionally, the owner may attempt to recover expenses by charging higher than normal access and per period of time fees to make up for the less frequent use of the phone.

Many existing public pay phones are connected to the analog telephone network, otherwise known as Plain Old Telephone Service (POTS), and thus are limited in the kinds of service that can be provided to a public customer. For example, compared to Voice over IP (VoIP) phones, analog public phones can provide many of the business level (CENTREX) functions that VoIP phones can provide, but they cannot provide high speed data services, such as video, given that POTS line connections are limited to 64 kilobits per second (kbs) in either direction. VoIP phones, on the other hand, can be easily connected to network connections which provide much higher rates of data throughput, thus supporting services like video over that connection.

Not all VoIP phones and their connections are capable of supporting video. The reasons are many, but can be sufficiently discussed with a few items: A) protocols B) bandwidth C) device hardware support and D) quality of service of both the network connection and the VoIP phone itself.

Hardware support for video is the most important feature for a VoIP device to be able to support any VoIP and/or video stream. VoIP phones and devices tend to fall into one of four classes: A) Analog Telephone Adapters (ATA's) B) Audio only VoIP phones, C) Video VoIP phones and D) VoIP soft phones. ATA's provide an analog telephone connection to a POTS phone, while transforming the signal on the other end to a digital packet protocol that is compatible with the VoIP Service Provider's (VSP) network that a customer has engaged to make calls over a digital network, including the Internet, terminating to another POTS or VoIP phone or other communications device. By definition, ATA's will not support video streaming, as POTS phones do not. Additionally, ATA's do not come with any hardware that would support a video stream, should it receive one. This is done primarily as a cost savings measure, in addition to the fact that with POTS phones it is an unneeded feature. These devices typically are priced very low compared to many dedicated, full featured, VoIP phones, so as to provide the least expensive way for a customer to enjoy the benefits offered by a VSP.

Audio only VoIP phones behave and act like POTS phones with the same class of features. The difference lies in the connection. Audio only VoIP phones require a digital broadband connection to make and receive telephone calls. Audio only VoIP phones do have an advantage over their POTS counterparts in that they can utilize multiple protocols to send and receive audio in order to save bandwidth, or transmit a higher quality signal to the receiving end.

Popular audio coder/decoders (codecs) range from G.729A/B at the low end of the bandwidth scale, along with G.726, G.723 to G.711 at the high end of bandwidth usage. This flexibility in bandwidth requirements allows Audio only VoIP phones to service many different types of needs with many different types of broadband connections.

G.729 is mostly used in VoIP applications for its low bandwidth requirement. Standard G.729 operates at 8 kbit/s, but there are extensions, which provide also 6.4 kbit/s and 11.8 kbit/s rates for marginally worse and better speech quality respectively.

Video VoIP phones are the most sophisticated and generally the most expensive of the VoIP phone hardware family. Much more processing is required of them to produce both audio and video signaling, as well as telephone service features. In addition to the audio codec pantheon supported by Audio only VoIP phones, Video VoIP phones add video codecs, such as H.261, H.263 and H.264 to the mix. Many implementations of Video VoIP phones include computer like functionality, such as browsers, network utility and configuration applications, and aesthetic applications to assist users in configuring, managing and adapting the phone to their environment and needs. Computing power in Video VoIP phones comes near to and sometimes rivals that found in many laptop and desktop computers. This processing capability is what makes the additional functionality and video processing in real time possible.

While it may appear rather strange to discuss VoIP soft phones in the same category as hardware versions of the same, there is a high degree of similarity with the hardware version. Essentially, VoIP soft phones depend upon a host computer and operating system to provide the environment where it can operate. Depending on the computing power and capacity of the host machine, a soft phone can make regular audio only calls, video calls, instant messaging, file transfers, e-mail, conference calls, and many other "computer and phone like" functions. The positive to this hardware/software relationship, is the soft phone can be configured or expanded to take advantage of the additional processing, storage, and resource capacity of the host machine. Also, because the soft phone runs on general purpose hardware, there are many opportunities to apply this combination in solving many telecommunication problems that would not be satisfied sufficiently with a dedicated phone function and styled device. The downside to soft phone embodiment entails costs (much more costly than dedicated VoIP hardware), physical size, power requirements, and lack of portability (in some cases). This also limits in some respects the telecommunications problem set that can be addressed efficiently.

Because of the aforementioned flexibility of the VoIP soft phone, it is possible to address, more effectively, the main business limitations experienced by currently deployed public pay phones and kiosks. However, there are some basic requirements that must be met, given current technology, in order for the VoIP soft phone to function as a viable alternative to existing public pay phones and kiosks.

For starters, a broadband connection of sufficient speed and quality must connect the VoIP soft phone to the VSP that is providing the service. Standard POTS lines limit their frequency response to 4 KHz, and their digital counterpart (DS0), limits its clocking to 64 kbps for connections of any type. This is fast enough to accurately render an audio signal with a bandwidth of 200 Hz to 3600 Hz, which has been used for many years to carry phone conversations on POTS analog lines. In the VoIP world, several popular audio codecs can operate within this bandwidth range: G.711 requires 64 Kbs to render an audio signal, G.723 uses between 16 Kbs and 40 Kbps, and G.729 uses between 4 Kbps and 16 Kbps.

Digital Video signals in the VoIP world come in a variety of quality and physically rendered image sizes to meet a number of different needs. In general, the bandwidth requirements for a video VoIP signal can range from 40 Kbs to 2 Mbs. The higher the bandwidth, the bigger the image size and the better the quality of that video. At the low end of the bandwidth scale image resolutions can range from 88×72 pixels, to 178×144 pixels with frames rates of about 5+ frames per second. At 2 Mbs, the image resolutions approach television quality high definition rendering, with a size of 704×576 pixels (and larger in some cases) with frames rates up to 30 frames per second.

While it is desirable to have as high a quality of video image and audio signal, that desire must be balanced against financial costs associated with the generation and transport of that signal. Current popular video codecs include H.261, H.263 and its variants, and the most recent codec, H.264. H.261 is the oldest of the codecs, introduced in 1990, and requires the most bandwidth of the three mentioned to produce the equivalent video resolution and frame rate. H.261's was the first practical digital video standard and set the stage for the creation of subsequent standards such as MPEG-1, MPEG-2 (H.262) and so on. H.263 was introduced in 1995/1996 and provided better image compression and bandwidth usage than its older sibling. This codec family is still in widespread use today in the VoIP world and provides a good quality image for its intended design use in video conferencing. It is efficient enough that Adobe® adopted the codec for use in their very popular Flash 8 format. In May 2003, H.264 (also known as MPEG-4) was introduced as the most efficient codec for compressing and delivering video signals over low bandwidth connections. It was also the first of these codecs to be designed with the intent to operate efficiently on RTP/IP packet networks and multimedia telephony networks. Using this codec makes Video VoIP telephony even more cost effective.

A reasonable comprise that is "good enough" for a typical video phone conversation, would require the use of either H.263 or H.264 for video at Common Intermediate Format (CIF) resolution of 356×288, coupled with one of the following audio codecs: G.729, G.726, or G.723. Depending on the combination of codecs, hosting hardware, and VSP, bandwidth requirements could run from about 150 Kbs to 256 Kbs to support video calls at up to 30 fps.

A final requirement to bring VoIP service in line with existing POTS service centers on Quality of Service (QoS). QoS, in essence, is the practice of managing the streaming packets that comprise a VoIP phone call so that as many packets as possible arrive between sender and receiver in a timely manner and in the proper order. Since POTS is analog in nature, there is no need to manage anything other than signaling, as all call information (including control and voice) arrive at their intended destination on time and always "in order". There are no packets to manage. VoIP on the other hand is built on top of the TCP/IP protocol, which itself is physically transported across copper and optical lines as Ethernet or ATM packets. By design, TCP/IP is "store and forward", meaning that packets generated between two end points do not have to arrive at a particular time, nor in order. Because TCP/IP is not "real time", nor packet ordered in its delivery, this gives the protocol and applications that use it for data transfers over that connection, a great deal of flexibility on how they transmit and route data from one point to another. This flexibility is not conducive to real time applications such as telephony, which requires deterministic packet order and delivery times for proper telephone call packet conversation to analog signaling at both ends of the phone call. To compensate for this feature of TCP/IP, many VoIP devices, software and VSP's use techniques such as packet ordering, jitter buffers, and packet prioritization to ensure QoS.

What is needed is a public conveyance that couples analog and digital telephony, video, and additional related services. What is also needed is a method of near if not continuous income generation to provide these services at commodity pricing to encourage increased use, as well as a more stable income to the owner of this conveyance. The present invention solves these problems with the use of scheduled paid advertising and other income generating business techniques, digital communications protocols, broadband connections, video hardware support, and QoS techniques to create a novel delivery of information in telephony and related services to the public.

SUMMARY OF THE INVENTION

The primary aspect of the present invention is to provide an improved public communications kiosk.

Another aspect of the present invention is to provide for advertisements for display at a kiosk.

Yet another aspect of the present invention is to provide for advertisement revenue for the kiosk investor.

Still another aspect of the present invention is to provide a kiosk for communications.

Another aspect of the present invention is to provide a kiosk that is ergonomic with special features desirable for the elderly or handicapped, an alternate embodiment.

Still another aspect of the present invention is to provide a financial kiosk to link to a virtual broker for financial transactions or research, another alternate embodiment.

Another aspect of the present invention is to provide an expanded service kiosk, yet another embodiment, with a large range of functions including but not limited to communications, financial, travel, etc.

Another aspect of the present invention is to provide advertisers with the ability to advertise to a targeted group of consumers.

The present invention combines a number of features to create an improved public communications kiosk, with at least four different embodiments, by providing:

Improved Revenue Production
Bundling of Communications Services
Ease of Use (Ergonomics)
Expansion and Targeting of Services
Personalized Communications Environment
Portable Personal Data
Demographics for ad Targeting and Analysis
The invention consists of four basic type of kiosks.
1. A general communications kiosk
2. A senior citizen and ergonomic kiosk
3. A financial kiosk
4. An expanded services kiosk
These will be described in detail below along with details of the working system of the invention.

Other aspects of this invention will appear from the following description and appended claims, reference being made to the accompanying drawings forming a part of this specification wherein like reference characters designate corresponding parts in the several views.

Figure 1:
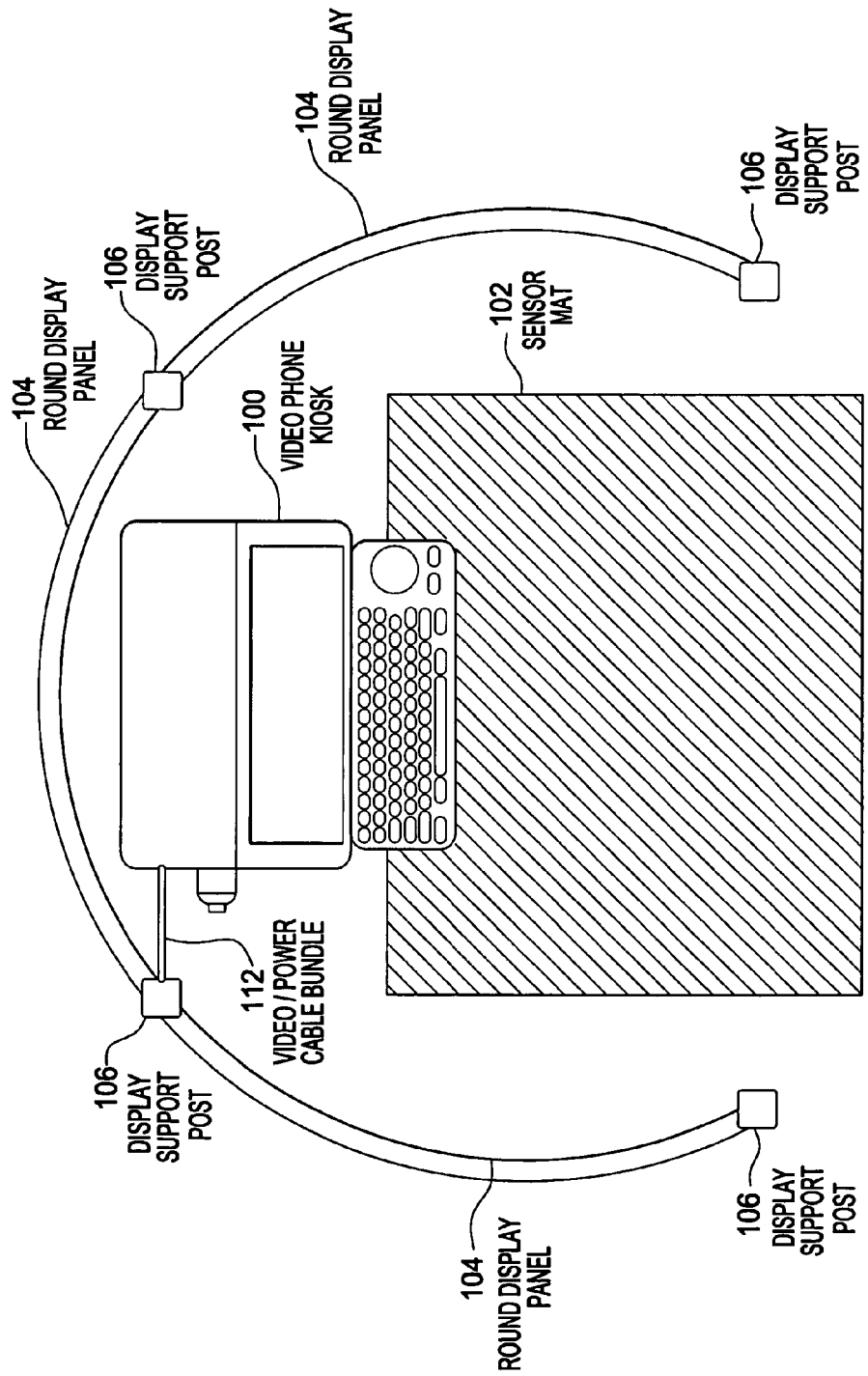
FIG. 1 is a top view of Video Phone Kiosk with Round Attractor Display and Sensor Mat.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

The present invention provides an improved public communications kiosk. It also provides for display of advertisements and associated revenue collected from advertisements. Another embodiment of the present invention provides a senior citizen and ergonomic kiosk with special features desirable for the elderly and/or handicapped. Yet another embodiment or the present invention is to provide a financial kiosk to link to a virtual broker for financial transactions or research. Still another embodiment is to provide an expanded service kiosk, yet another embodiment, with a large range of functions including but not limited to communications, financial, travel, etc. These will be discussed in detail below.

The present invention combines a number of features to create an improved public communications kiosk, with at least the four aforementioned embodiments, by providing the following features:

A. Improved Revenue Production
B. Bundling of Communications Services
C. Ease of Use (Ergonomics)
D. Expansion and Targeting of Services
E. Personalized Communications Environment
F. Portable Personal Data
G. Demographics for ad Targeting and Analysis These aforementioned features are now described in more detail.

A): Improved Revenue Production:

Current public phones and communications kiosks are primarily dependent on revenue generation by charging time for actual use of services. For phones and kiosks that are located in areas where they will see a majority of their time providing services, instead of waiting for a customer to engage them, this revenue generating model is profitable, but not efficient. For those phones and kiosks located in low traffic and/or use areas, the revenue model is neither profitable, nor efficient. The issue lies in the fact that no money is being generated between customers.

This invention solves that problem in a unique way, by coupling pay for communications services with using an established means (advertising) to generate revenue, even when the kiosk is not in use. Using a physical 'Attractor', attached to the video phone kiosk, this kiosk will spool both still ads and video ads with, or without sound, on at least 3 sides of the invention kiosk, in order to attract people's attention and appeal to their curiosity to have a closer look at what the kiosk is displaying. The 'Attractor' would be a display (round, flat, winged etc.) that would carry ads to 'attract' customers to the kiosk. The display is capable of still, video, voice or combinations thereof. It could be an 'outside' only display or an 'outside/inside' display having double sided screens as seen by the customer. The kiosk itself can accommodate one or more individuals for applications that might involve more than one person. The ads themselves are scheduled and managed remotely, just as a TV or Radio station would schedule and run advertising, based on an advertiser's willingness to pay for time slots within a 24 hour daily cycle, as well as the number of times to run the ad, and which target areas or regions of the country, city or geography would be best suited for the goods and services the advertiser is offering.

When revenue generating ads are balanced against the kiosk services usage, and the slack time between customers, it presents a revenue model that is both efficient and profitable for a wide range of usage/slack time scenarios. For example, the Denver International Airport is a high traffic area, serving 47.3 million people for fiscal year 2006. Within the facilities are a number of shops and services, including pay phones and communications (Internet) kiosks. Many of these communications facilities stand idle the majority of the time, due primarily to personal cell phones and wireless connections for laptops, PDA's, BlackBerry's®, and other communications devices. When they are in use, calls and access are of short duration as the pricing per minute or by service is high by comparison to the service rates many people receive with their cell phones, PDA's, and other communications devices they will use during travel. An additional issue with the communications kiosks and pay phones that is there is very little effort made to actively attract customers to them for use.

This invention addresses these shortcomings directly by providing a kiosk owner with the ability to generate a near continuous revenue stream through the use of rotating advertising on all screens except for the main user kiosk monitor when the kiosk is in use. The main user kiosk monitor will display ads when the kiosk is not in use. The present invention provides communications and other services that are unique to the kiosk, or are bundled in such a way, they present a very convenient and attractive package to the customer. Thus ad revenue is produced by solicitation of advertisers, selling time slices, collecting ads, sending to targeted kiosks and displaying the ads.

B: Bundling of Communications Services:

Communications services in and of themselves represent a level of value that justifies their existence. For example, the regular telephone call, which gets less expensive almost yearly, is a service that people want, need and consider indispensable to have for business, personal reasons, or simple peace of mind. The technology has changed dramatically since the days of Alexander Graham Bell, but the use of a telephone call has not. In essence, the value of the telephone call lies in the inherent convenience to communicate with someone else at a distance.

As technology has progressed, it has become common, if not fashionable, to bundle additional services with the telephone call to increase the convenience value, while decreasing the out of pocket cost to the end customer. The present invention is no different in this respect, as it has the ability to bundle more than one type of communication service together, in addition to the ability to bundle additional goods and services dependant on those bundled communication services. This gives the kiosk the ability to specifically focus on different types of customers, or to remain a "general" communications kiosk with no specific demographic target.

For example, as part of the basic embodiment of the present invention, the kiosk provides for video phone calls. This requires the use of a camera to capture and transmit an image to some designated endpoint, whether it is a storage device, an application, or another video phone device at the end of a communication's connection. Leveraging the fact that the kiosk has the ability to record images, both moving and still, and that it has a method to transmit those images to some designated location, the invention can support bundled services requiring these type of facilities, such as video mail, personalized greeting card creation, video "post cards" and other similar types of services.

C: Ease of Use

The ergonomics of any system, device or invention has a direct bearing on the acceptance and long term use. This invention addresses this need in several ways. First, the kiosk itself is located at an elevation (average table height) that allows a customer to sit comfortably in a stool or chair and operate the kiosk itself. Second, the height of the kiosk allows for those handicapped persons in a wheel chair or mobile cart to operate the kiosk without having to spend a great deal of time and energy or require help to do so. Third, the 'Attractor' itself is designed to allow small groups of people to gather around the kiosk and participate in a video call, video mail, or other service, while at the same time providing access to those in wheel chairs and mobile carts. Fourth, the use of user inputs such as touch screens, trackballs, mouse buttons, keyboards, and voice recognition allow the customer applications to format data and customer responses so that the customer spends as little effort as possible to use the kiosk and the services it provides.

D: Expansion and Targeting of Services

Because bundling of communications services is endemic to this invention, this quality allows specifically for the expansion and/or targeting of services towards a specific demographic, region, product set, market, etc. The primary purpose of expanded and/or targeted services in this invention is to directly address the needs of a particular vertical market segment. Some of the markets that have been identified as viable and targeted for this invention include but are not limited to financial services, senior citizens, college students, medical needs, diagnosis and information, travel, shopping, dining, social and leisure, online and/or network gaming, and churches.

E: Personalized Communications Environment

Public pay phones and communications kiosks lack the ability to address the end customer specifically. There is no general mechanism available today that would let a public pay phone or communications kiosk configure itself automatically for services and preferences to John Q Public every time John uses one of these existing devices. This invention solves this immediate problem and the ancillary problem of "Is John Q Public the person actually using this kiosk?" (authentication), so that John does not get charged for services he never used.

Personalization provides a real value to a customer who would use this invention, as the presentation of displays, services paid for and application behaviors are familiar to the customer and reflect the services they are entitled to, regardless of which kiosk is being used. This gives a convenience and efficiency that can be had no other way.

As technology has increased its ability to process and store more information, it has become easier to maintain very large data sets, or very large amounts of data, distributed throughout a wide area or large group of people, machines or networks. In the case of Personalization, the data associated with a particular customer can be stored for universal access in one of two ways. The first utilizes the storage and distribution capabilities of the network attached to the kiosk. Since the kiosk is remotely managed, then one of those management features would be for the kiosk to access a data repository of customer information and then configure its displays, behaviors and available services whenever the user identifies themself to the kiosk. The advantage here is the data is always available to the customer, no matter which network connection they use. The customer does not need to carry any physical storage medium with them to acquire this service state in a kiosk. The downside to this lies in the expense to the network provider for the use and storage of data in their facilities.

The second method of universal data access for the customer is for the customer to store the data locally on some medium such as a jump drive, flash drive, micro drive, flashcard, magnetic stripe card, CD, or DVD or other conveyance. This method keeps the data local to the customer, and they use the storage method of choice to configure the kiosk to their liking. The advantage here is the reduced costs to the network provider, the lack of responsibility to retain and maintain accurate customer data and configuration, and the customer has a choice as to how they wish to handle their personalization. The downside to this method is born by the customer. If they forget their medium, or the medium fails, they cannot personalize the kiosk for that session. Also, the customer could loose their medium or have it stolen, in which case, they put themselves at a financial risk.

At this point, the second issue, authentication needs to be addressed. Authentication, in terms of this invention serves the purpose of protecting the customer from paying for services they did not request or use. Coupled with the ability to personalize services to a customer brings the need to make sure the personalization is actually happening for the customer for which it is intended. Proper authentication involves the use of data that is only "known" between the customer and the network service provider. This can take the form of PIN numbers, passwords, pass-phrases, hashes, or other types of data that can be provided by the customer to the network which trusts that "John Q Public" is the person providing that information. As common as that method is, the weakness lies in the fact that such information can be discovered and is not truly unique to the individual providing it—meaning that anyone who has that data can pretend to be John Q Public and avail themselves of John's services. A more secure method of authentication uses a biometric signature to validate the identity of John Q Public before providing services.

Figure 20:
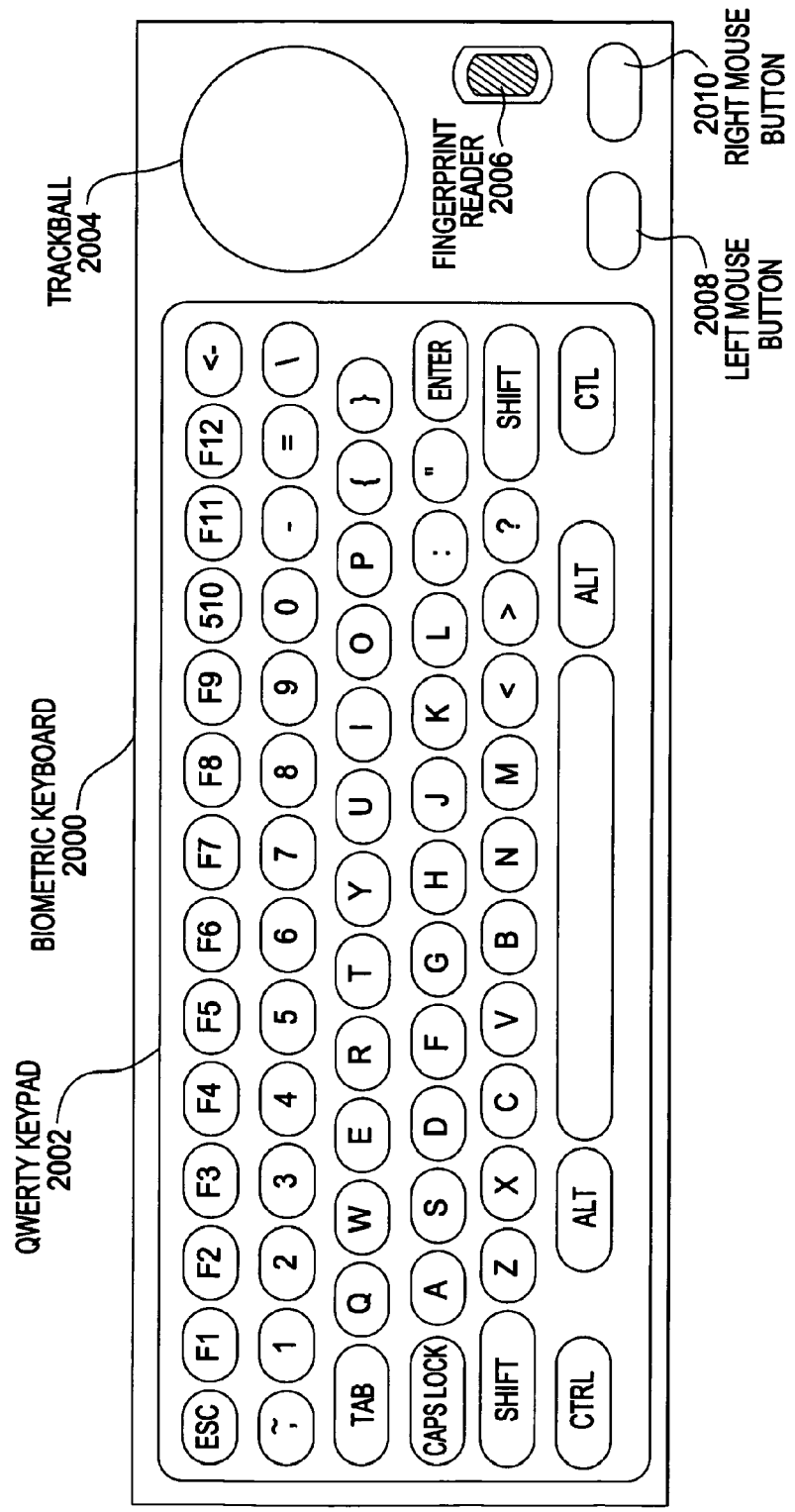
FIG. 20 is a top view of the Biometric Keyboard.

Biometric signatures are digital data that represents some unique physical quality to the human body that statistically is extremely unlikely to be replicated by another person. Such signatures usually involve, but are not limited to, fingerprints, handprints, or retinal scans. For this invention, the preferred method uses fingerprints as the authentication data, as they are quick to produce, small to store, easy to collect and generally accurate. Using a biometric keyboard (ref. FIG. 20), the customer can respond to a query from the kiosk to provide a fingerprint and then the kiosk will personalize itself once the fingerprint is verified against the customer.

F: Portable Personal Data

The concept of portable personal data is not new, but it is a very powerful one that lets the customer leverage the invention in ways that existing public pay phones and communications kiosks cannot do today. Typically portable personal data is usually coupled with a personalized environment, as the symbiotic relationship between the actions provided by personal data and services is too great to ignore.

In this case, the invention uses both concepts to allow for several new things to occur: A) Electronic Funds, B) Profile data for analysis, C) Usage statistics, and D) Related service. Electronic funds are the most versatile and directly provide impact on the customer. The invention allows for the dedication of electronic funds within the network services system that can be used to pay for goods and services. The advantage to the network services provider is the funds do not leave the system, but will be spent on some kind of selected good or service. The customer has a way to measure and dedicate monies to activities associated with the kiosk services and does not need to provide a 'funds card' each time there is a transaction. Profile data and usage statistics are gathered to make the customer's experience more tailored to how they use the kiosk and services, as well as provide valuable data for research and analysis. Related service is a downstream function of profile data and usage, and can be stored with the customer data as a means of remembering what services to offer the customer in the future (much like a Web site cookie).

G: Demographics for Ad Targeting and Analysis

Demographic data as generated by this invention falls into two broad categories:

1) User profile data and usage statistics; and
2) Network/Kiosk profile data and usage statistics.

Each of these categories will now be addressed separately.

First: User Profile Data and Usage Statistics

Demographic data in this category is generated specifically by the customer while interacting with the kiosk of the present invention and the associated network services. Data is collected to reflect such metrics as:

Time of Day
Average Length of Call
Longest Call
Shortest Call
Number of Calls
Kiosk Location
Greeting Cards Ordered
Video Mails Sent
Ad running at start of session
Ad selected
Purchase information
High Money transaction
Low Money transaction
Average Money Transaction The above metrics are mentioned by way of example and not of limitation. Thus the examples given are by no means inclusive of the data types and derived data that are collected and stored. These data points and others are analyzed to understand the usage trends of the customer and to provide detail data for advertisers and services that can be enhanced to satisfy the needs and habits of the customer as they use the kiosk.

Second: Network/Kiosk Profile Data and Usage Statistics

Network/kiosk profile data and usage statistics data is collected at the network level and is used specifically to assess the influence of the attractor ads for vendors, location, customer types, and also for setting ad pricing, service offerings at the kiosk and the frequency of service use, customer demographics that indicate what additional services would be good to offer, as well as ad targeting for a specific geographic area.

The present invention has four basic embodiments that provide all of the kiosk variations necessary to address any identified and viable vertical market. These embodiments are designated as General, Senior Citizen or Ergonomic, Financial, and Expanded Services. Each of the four embodiments is described now in more detail as follows:

1. General Embodiment

The General Embodiment of the invention utilizes a video phone kiosk, coupled with one of the three types of physical attractors (round, flat or wings), and either a sensor mat or proximity sensors. The services, as provided for all the embodiments, and the General Embodiment specifically, are basic Audio Phone calling, Video Phone calling, Video Mail, and creating Greeting Cards. These are all pay for services, so there is electronic payment processing through a merchant account as well. For auditing purposes receipts to a customer will be provided either by e-mail or by a fax to a customer provided fax number. The Audio and Video Phone calling is done via VoIP and uses H.263 or H.264 formatting as a basis for the video signal, with G.711, G.723, G.726 or G.729 A/B support for the audio portion of the call. Video Mail will support codecs from the aforementioned list.

2. Senior Citizen or Ergonomic Embodiment

The Senior Citizen (or Ergonomic) embodiment contains all the hardware and software features of the aforementioned General Embodiment. In addition to the capabilities provided by the General Embodiment, the Senior Citizen Embodiment adds the following processes and capabilities:
Personalized profile for each user
External Membership creation and management Unique User Interface to simplify kiosk use, such as the aforementioned touch screen, voice recognition, auto dial, large font, etc.

Additional input devices for ADA compliance

These processes and capabilities are expanded upon below. A 'user' of this embodiment will be called a senior citizen for purposes of example and not of limitation. It should be noted that while this embodiment targeted for senior citizens, it is also beneficial to handicapped individuals and can be used by a wide variety of users.

To explain what is meant by a 'personalized profile for each Senior Citizen', each senior citizen that signs up to use this embodiment will create a personal profile on an external machine dedicated to creating and managing membership data. The membership data will include information such as their name, contact information, any applied funds/credit for goods and service purchases, pictures of 3 to 5 (or other limited number) first contact people, their addresses, phone numbers, e-mail addresses, and fax numbers.

The 'External Membership creation and management' is now explained. To create the membership the senior citizen and a member of their family that can act in their behalf or their legal guardian will supply the retirement home or other facility with information and any financial basis for greeting cards and video calls. Next, the senior citizen will have their picture taken, along with any other family, friends, guardians that are to be included in their calling circle. The information will then be stored for network access by the kiosk and a magnetic stripe card will be created with the senior's picture on it and the information necessary to activate and customize the Senior Citizen application.

To manage the membership, the retirement home or other facility will use the membership application to update any information for the senior's account. This would include contact information, finances, people in the calling circle, etc.

The 'Unique User Interface to simplify use' is now explained. To keep things as simple as possible, the user interface will have as little text as possible. Instead, it will rely primarily on graphics to facilitate navigation and function. When the senior slides their card into the credit card reader, the application will read the membership information off the card and query the remote membership base for a match. If a match is found then the application will retrieve the pictures of the calling circle and arrange them on the screen so that all the senior has to do is touch one of the pictures, or use an ADA compliant USB pointing device to select the picture of the person they want to talk to, and the application will dial the number provided with the calling circle information. Another method would be 'voice recognition' whereby the senior citizen would say for example 'call number 3' to call a person listed third. If the senior wants to send a video mail instead, they will select the video mail icon first before selecting the picture of the person they want to send the video mail to. The application will bring up the video mail module that will record the video mail and will automatically send it at the touch or selection or voice recognition of the prescribed button. If the senior wants to send greeting card, then they would select the Greeting Card icon before selecting a picture from the calling tree. The application will activate the Greeting card module and the senior can select the card they like, enter some prose, and even select a scent to be applied to the card and envelope before it is mailed.

Finally to explain the 'Additional input devices for ADA compliance', in some instances there are seniors (or other users) that for one reason or another cannot successfully navigate the interface with a trackball or a touch screen. For these seniors, there are a number of ADA compliant input devices, such as air tubes, joysticks, voice recognition and other input devices designed to accommodate people with disabilities. The invention allows for the use of such devices to facilitate the navigation of the simple senior interface.

3. Financial Embodiment

The Financial Embodiment focuses on the investment markets, such as stocks, bonds, derivatives and commodities. The purpose of this embodiment is to provide investors with an active (and interactive) and personalized trading station with links to a brokerage ("Virtual Broker™") in order to communicate with someone for information, transactions, or other needs that require human intervention.

While it can contain features from the 'Senior Citizen' embodiment, the Financial Embodiment contains all the functionality of the General Embodiment, plus it adds features from the Expanded Services embodiment (described below) such as a printer for hard copy output, or a CD/DVD Reader Writer for encoding information or retrieving information from that media, or a flash card reader to handle smaller amounts of data that the customer will provide, such as a personal profile, data, trading information, accounts, active contracts and personalized environment.

The application in this embodiment is designed but not limited to use the touch screen as well as the keyboard and trackball to allow the investor to use what they feel most comfortable with and is the most efficient for them. Part of the application for this embodiment will focus on market data, with technical indicators, data feeds and news wires, plus access to a brokerage house in order to place all the tools in front of the investor for a quick trade scenario.

Transactions will be done by EFT/Credit card and can be done over the video phone with the brokerage. Audit trail will provide receipts by e-mail, fax or hard copy print out at the investor's choice.

4. Expanded Services Embodiment

The Expanded Services embodiment contains all the General Embodiment functionality, plus hardware as portrayed below in FIG. 19, plus personalized environment, personal data, EFT transactions, ability to record and read from flash cards, USB drives, CD/DVD drives, output to printers, wireless connectivity, data feeds, wired network connections, and expanded mag-stripe card support.

This embodiment is intended to be non-specific as a foundation, but target specific vertical markets, which will be addressed specifically by the application developed to control and manage all the baseline hardware and services in existence.

DETAILED DESCRIPTION OF THE DRAWINGS

FIG. 1 is a top view of the Video Phone Kiosk with the Round Attractor Display and a Sensor Mat. The video phone kiosk 100 is aligned towards the back of the circle formed by the round display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the round display panel 104, underneath a cap that sits on top of the round display panel 104, used for decoration and to hide and protect the video/power cable bundle 112. A sensor mat 102 sits directly in front of, and is connected to, the video phone kiosk 100. The sensor mat 102 covers at least 50% to 75% of the floor area inside the circle formed by the round display panels 104 and the display support posts 106, directly in front of the video phone kiosk 100. It should be noted that the sensor mat 102 can be sized to cover any amount of floor space required in front of the video phone kiosk 100. The round display panels 104 will contain some kind of flexible display technology, such as OLED, LCD on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath. It should be noted that the shape of display panel 104 is shown by way of example and not of limitation. It should also be noted that display panel 104 can be a single or a double sided display.

Figure 2:
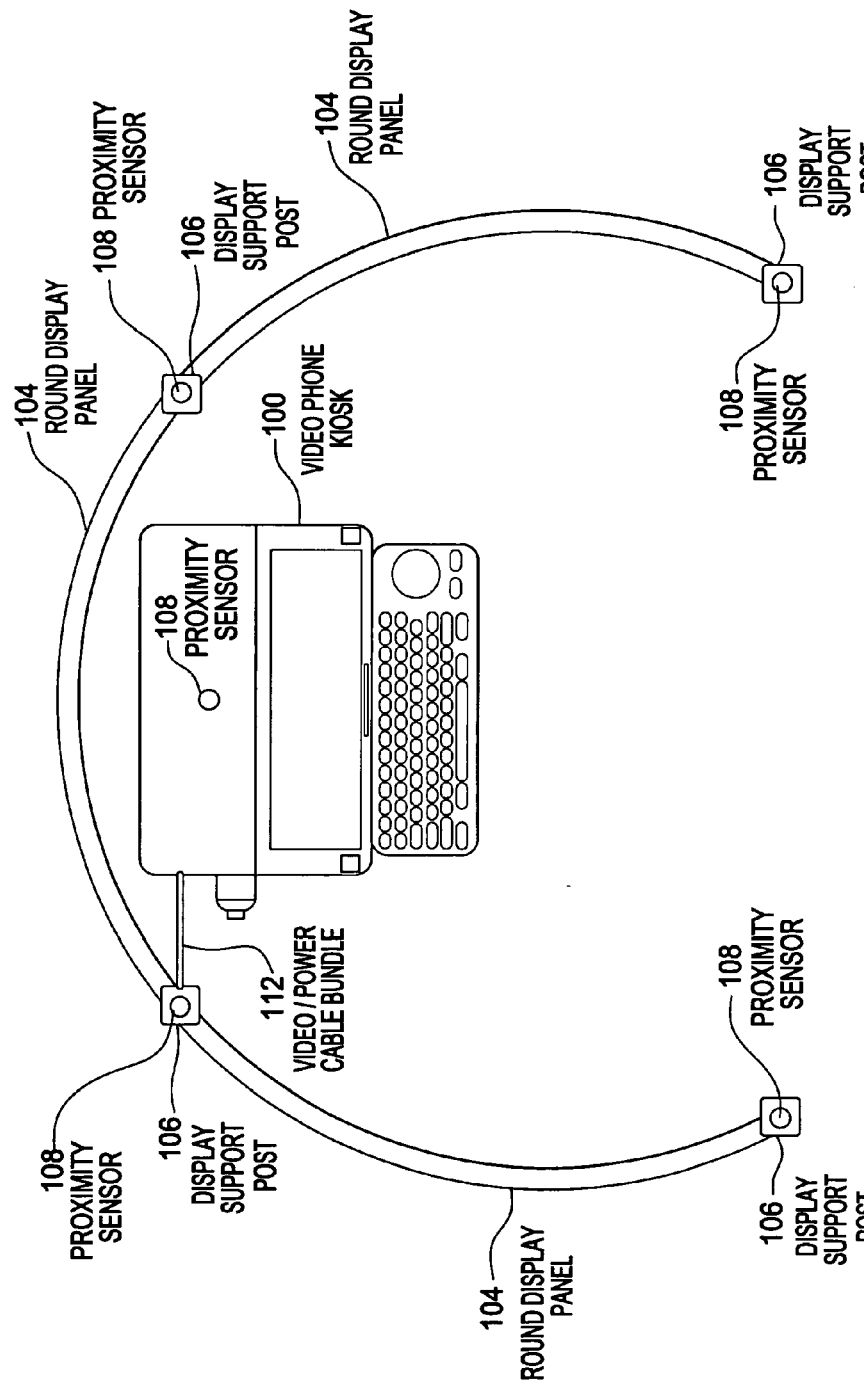
FIG. 2 is a top view of Video Phone Kiosk with Round Attractor Display and Proximity Sensors.

FIG. 2 is a top view of the Video Phone Kiosk with the Round Attractor Display and Proximity Sensors. The video phone kiosk 100 is aligned towards the back of the circle formed by the round display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the round display panel 104, underneath a cap that sits on top of the round display panel 104, used for decoration and to hide and protect the video/power cable bundle 112. In this embodiment, a communications cable runs as part of the video/power cable bundle 112 to interconnect any and all proximity sensors 108 to the video phone kiosk 100, It should be noted that typical deployments only require one proximity sensor 108 to effectively manage customer detection. The primary sensor will be located on the top of the video phone kiosk 100 and does not require and external communications cable. Instead, if the proximity sensor 108 is located on one or more display support posts 106, then the communications cable will be included in the video/power cable bundle 112. The round display panels 104 will contain some kind of flexible display technology, such as OLED, LCD on polymer or plastic substrate. The backing will be composed of a firm material such as metal or composite wood, plastic, Kevlar™ or other material that can be formed and keep its shape indefinitely. Covering the visible portion of the round display panel is a layer of transparent glass, plastic or other material that protects the physical display underneath.

Figure 3:
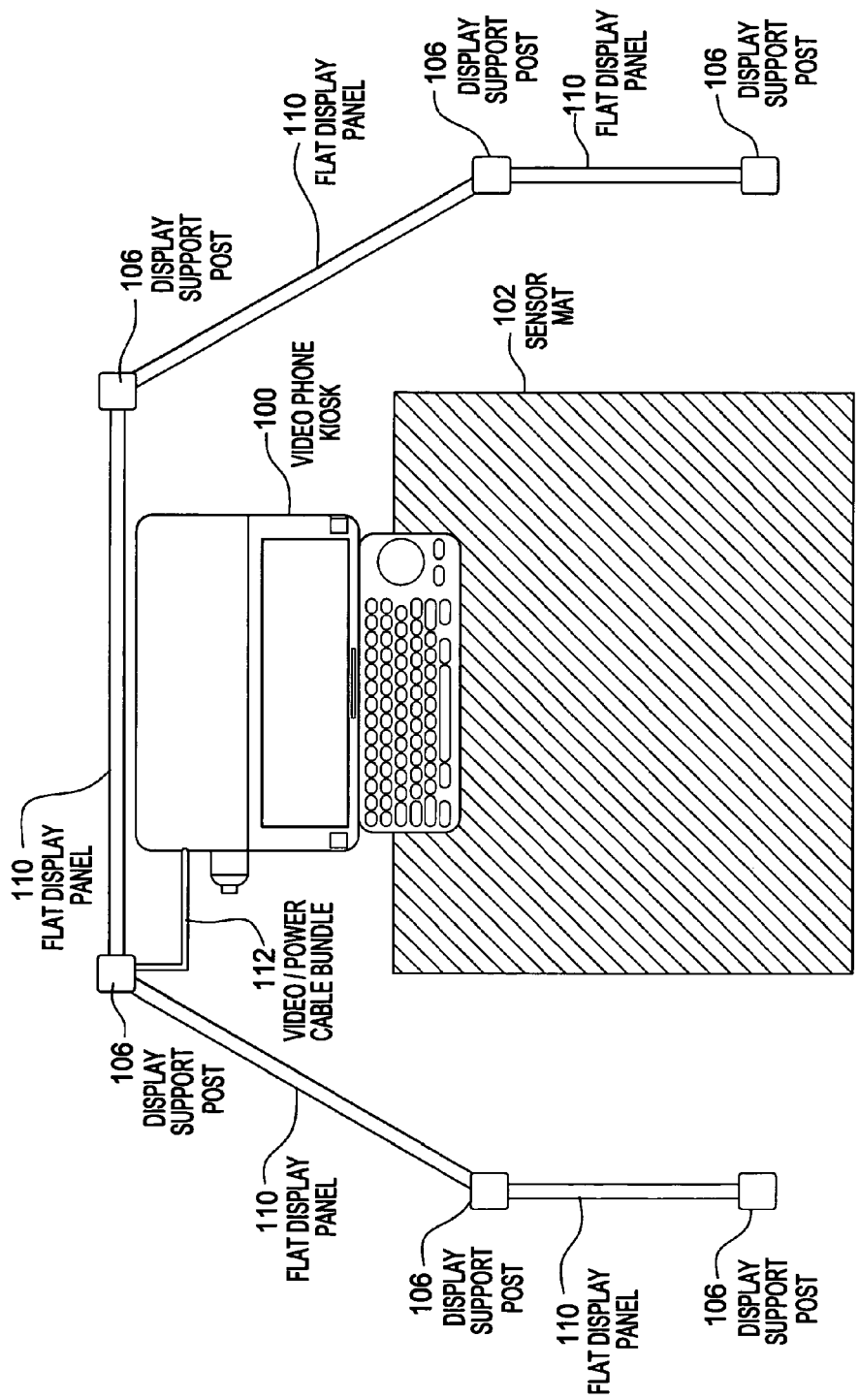
FIG. 3 is a top view of Video Phone Kiosk with Flat Attractor Display and Sensor Mat.

FIG. 3 is a top view of the Video Phone Kiosk with the Flat Attractor Display and a Sensor Mat. The video phone kiosk 100 is aligned towards the back of the semi-octagon formed by the flat display panels 110, supported by the display support posts 106. The video phone kiosk 100 is tethered to the flat display panels 110 with the video/power cable bundle 112 that extends into the display support panels 106. The video/power cable bundle 112 extends up the inside of the display support post 106 and then runs along the top of the flat display panel 106, underneath a cap that sits on top of the flat display panel 110, used for decoration and to hide and protect the video/power cable bundle 112. A sensor mat 102 sits directly in front of, and is connected to, the video phone kiosk 100. The sensor mat 102 covers at least 50% to 75% of the floor area inside the circle formed by the flat display panels 110 and the display support posts 106, directly in front of the video phone kiosk 100. It should be noted that the sensor mat 102 can be sized to cover any amount of floor space required in front of the video phone kiosk 100. The flat display panels 110 will contain some kind of flat display technology, such as LCD, LCoS, Plasma, flat CRT, or flexible display on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath.

Figure 4:
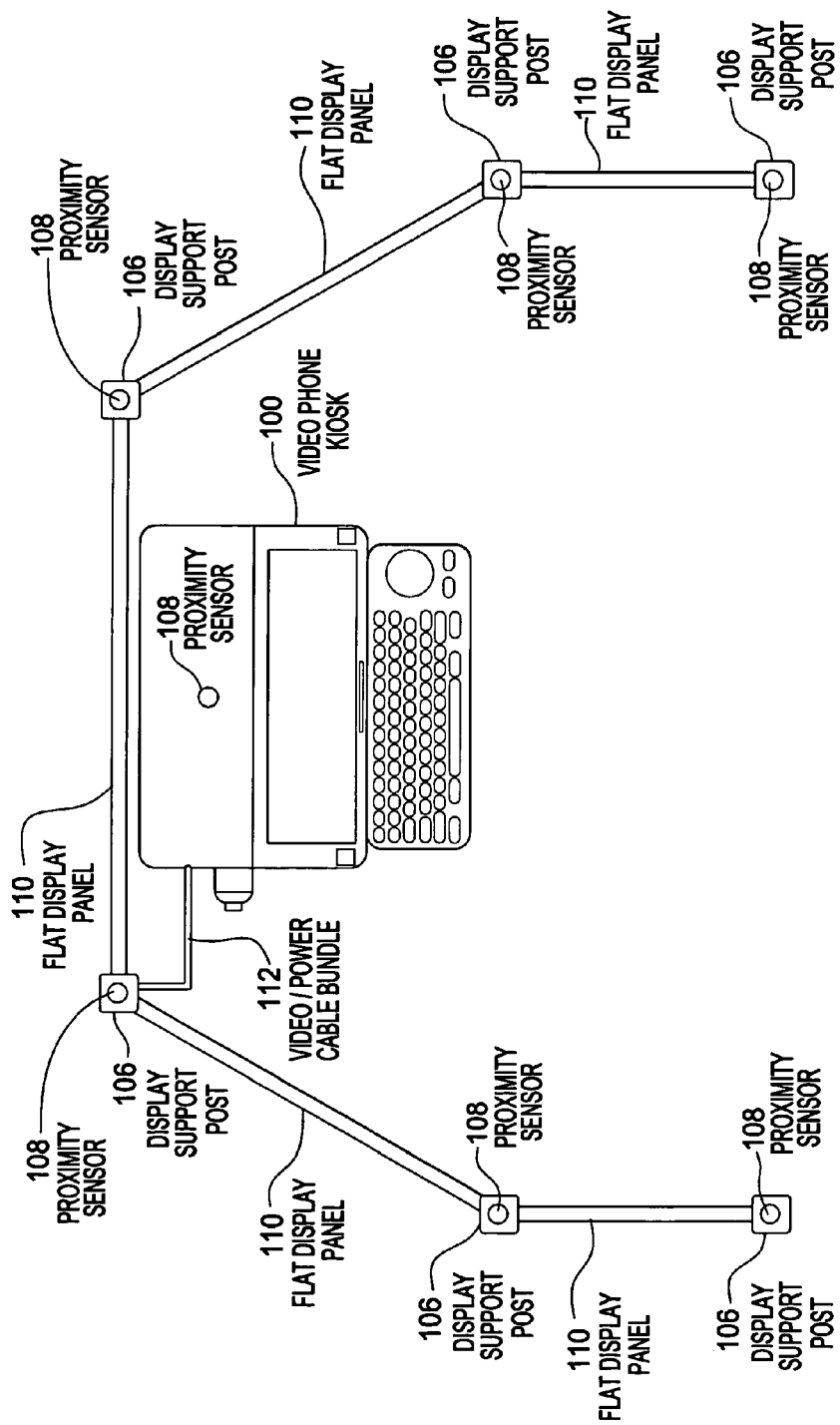
FIG. 4 is a top view of Video Phone Kiosk with Flat Attractor Display and Proximity Sensors.

FIG. 4 is a top view of the Video Phone Kiosk with the Flat Attractor Display and Proximity Sensors. The video phone kiosk 100 is aligned towards the back of the semi-octagon formed by the flat display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the flat display panel 110, underneath a cap that sits on top of the flat display panel 110, used for decoration and to hide and protect the video/power cable bundle 112. In this embodiment, a communications cable runs as part of the video/power cable bundle 112 to interconnect any and all proximity sensors 108 to the video phone kiosk 100, It should be noted that typical deployments only require one proximity sensor 108 to effectively manage customer detection. The primary sensor will be located on the top of the video phone kiosk 100 and does not require and external communications cable. Instead, if the proximity sensor 108 is located on one or more display support posts 106, then the communications cable will be included in the video/power cable bundle 112. The flat display panels 110 will contain some kind of flat display technology, such as LCD, LCoS, Plasma, flat CRT, or flexible display on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath.

Figure 5:
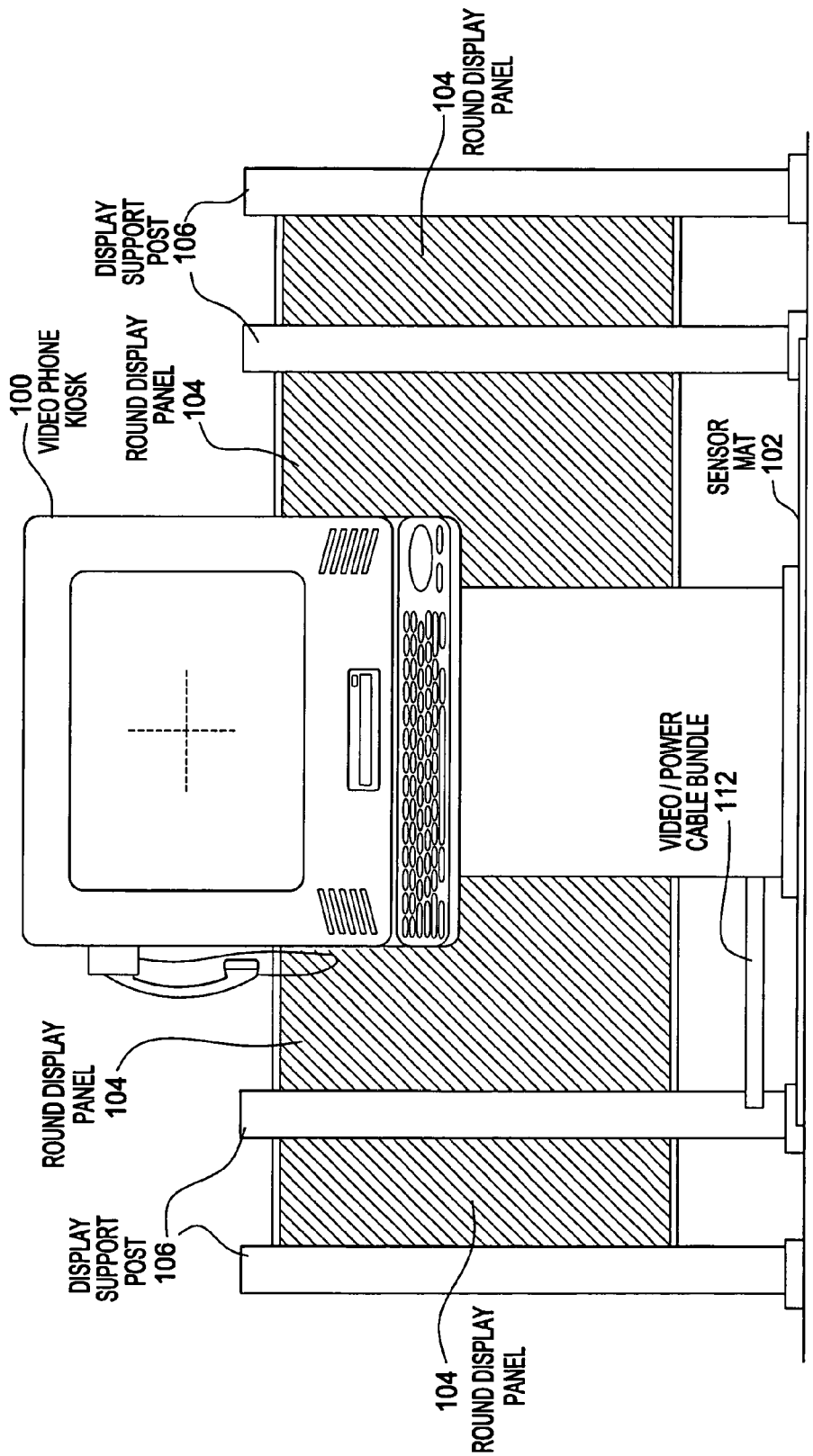
FIG. 5 is a front view of Video Phone Kiosk with Round Attractor Display and Sensor Mat.

FIG. 5 is a front view of the Video Phone Kiosk with the Round Attractor Display and a Sensor Mat. The video phone kiosk 100 is aligned towards the back of the circle formed by the round display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the round display panel 104, underneath a cap that sits on top of the round display panel 104, used for decoration and to hide and protect the video/power cable bundle 112. A sensor mat 102 sits directly in front of, and is connected to, the video phone kiosk 100. The sensor mat 102 covers at least 50% to 75% of the floor area inside the circle formed by the round display panels 104 and the display support posts 106, directly in front of the video phone kiosk 100. It should be noted that the sensor mat 102 can be sized to cover any amount of floor space required in front of the video phone kiosk 100. The round display panels 104 will contain some kind of flexible display technology, such as OLED, LCD on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath.

Figure 6:
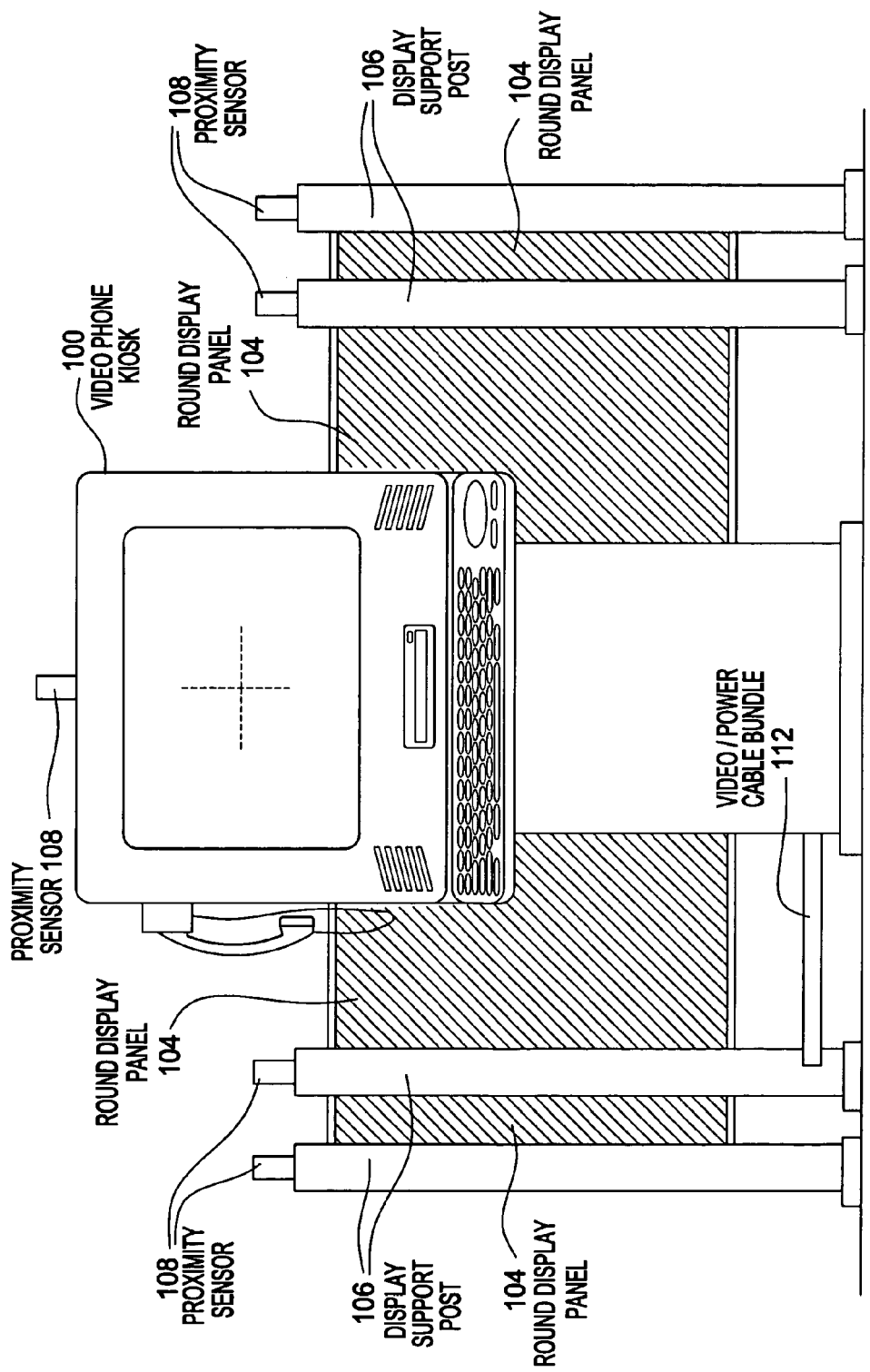
FIG. 6 is a front view of Video Phone Kiosk with Round Attractor Display and Proximity Sensors.

FIG. 6 is a front view of the Video Phone Kiosk with the Round Attractor Display and Proximity Sensors. The video phone kiosk 100 is aligned towards the back of the circle formed by the round display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the round display panel 104, underneath a cap that sits on top of the round display panel 104, used for decoration and to hide and protect the video/power cable bundle 112. In this embodiment, a communications cable runs as part of the video/power cable bundle 112 to interconnect any and all proximity sensors 108 to the video phone kiosk 100, It should be noted that typical deployments only require one proximity sensor 108 to effectively manage customer detection. The primary sensor will be located on the top of the video phone kiosk 100 and does not require and external communications cable. Instead, if the proximity sensor 108 is located on one or more display support posts 106, then the communications cable will be included in the video/power cable bundle 112. The round display panels 104 will contain some kind of flexible display technology, such as OLED, LCD on polymer or plastic substrate. The backing will be composed of a firm material such as metal or composite wood, plastic, Kevlar™ or other material that can be formed and keep its shape indefinitely. Covering the visible portion of the round display panel is a layer of transparent glass, plastic or other material that protects the physical display underneath.

Figure 7:
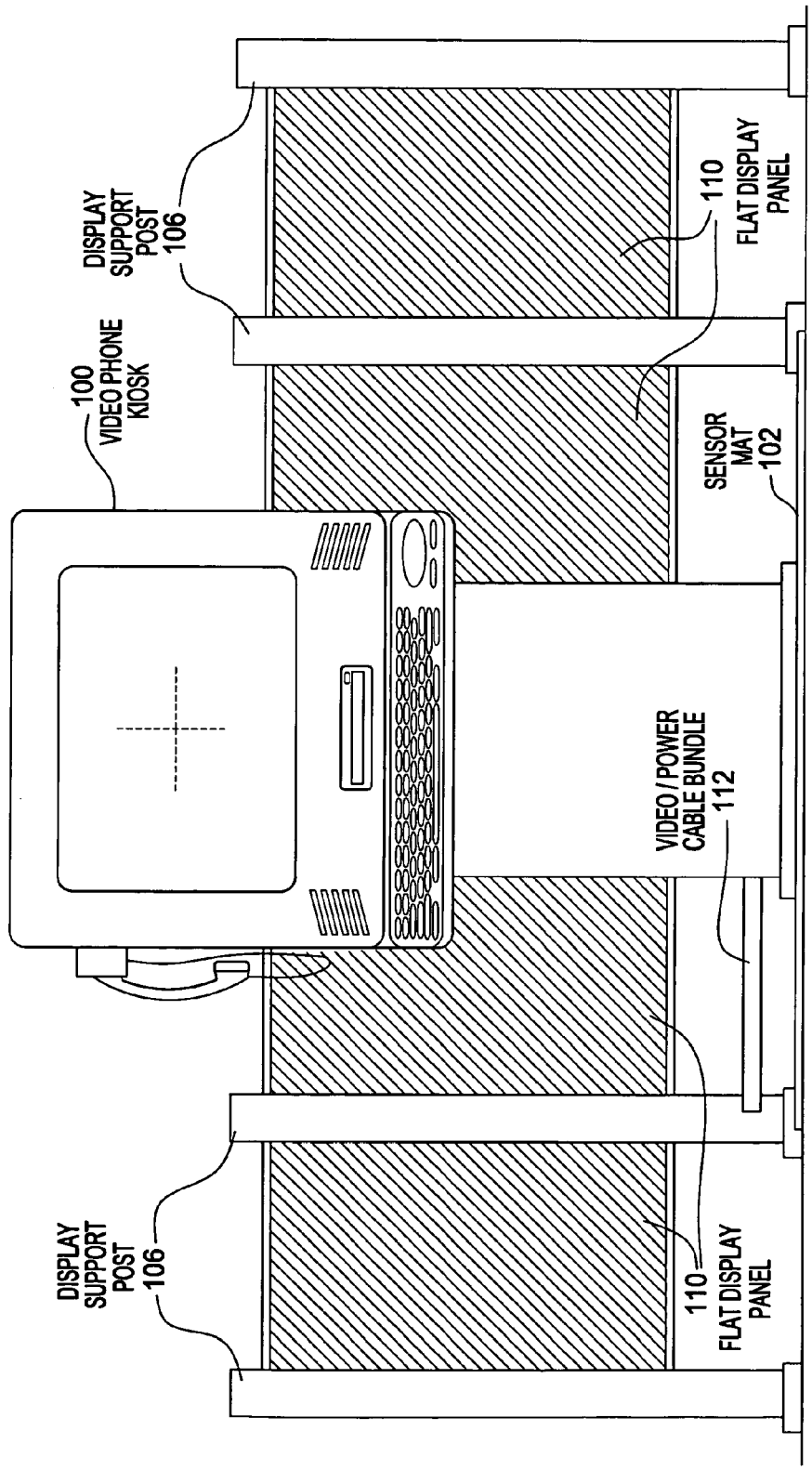
FIG. 7 is a front view of Video Phone Kiosk with Flat Attractor Display and Sensor Mat.

FIG. 7 is a front view of the Video Phone Kiosk with the Flat Attractor Display with a Sensor Mat. The video phone kiosk 100 is aligned towards the back of the semi-octagon formed by the flat display panels 110, supported by the display support posts 106. The video phone kiosk 100 is tethered to the flat display panels 110 with the video/power cable bundle 112 that extends into the display support panels 106. The video/power cable bundle 112 extends up the inside of the display support post 106 and then runs along the top of the flat display panel 106, underneath a cap that sits on top of the flat display panel 110, used for decoration and to hide and protect the video/power cable bundle 112. A sensor mat 102 sits directly in front of, and is connected to, the video phone kiosk 100. The sensor mat 102 covers at least 50% to 75% of the floor area inside the circle formed by the flat display panels 110 and the display support posts 106, directly in front of the video phone kiosk 100. It should be noted that the sensor mat 102 can be sized to cover any amount of floor space required in front of the video phone kiosk 100. The flat display panels 110 will contain some kind of flat display technology, such as LCD, LCoS, Plasma, flat CRT, or flexible display on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath.

Figure 8:
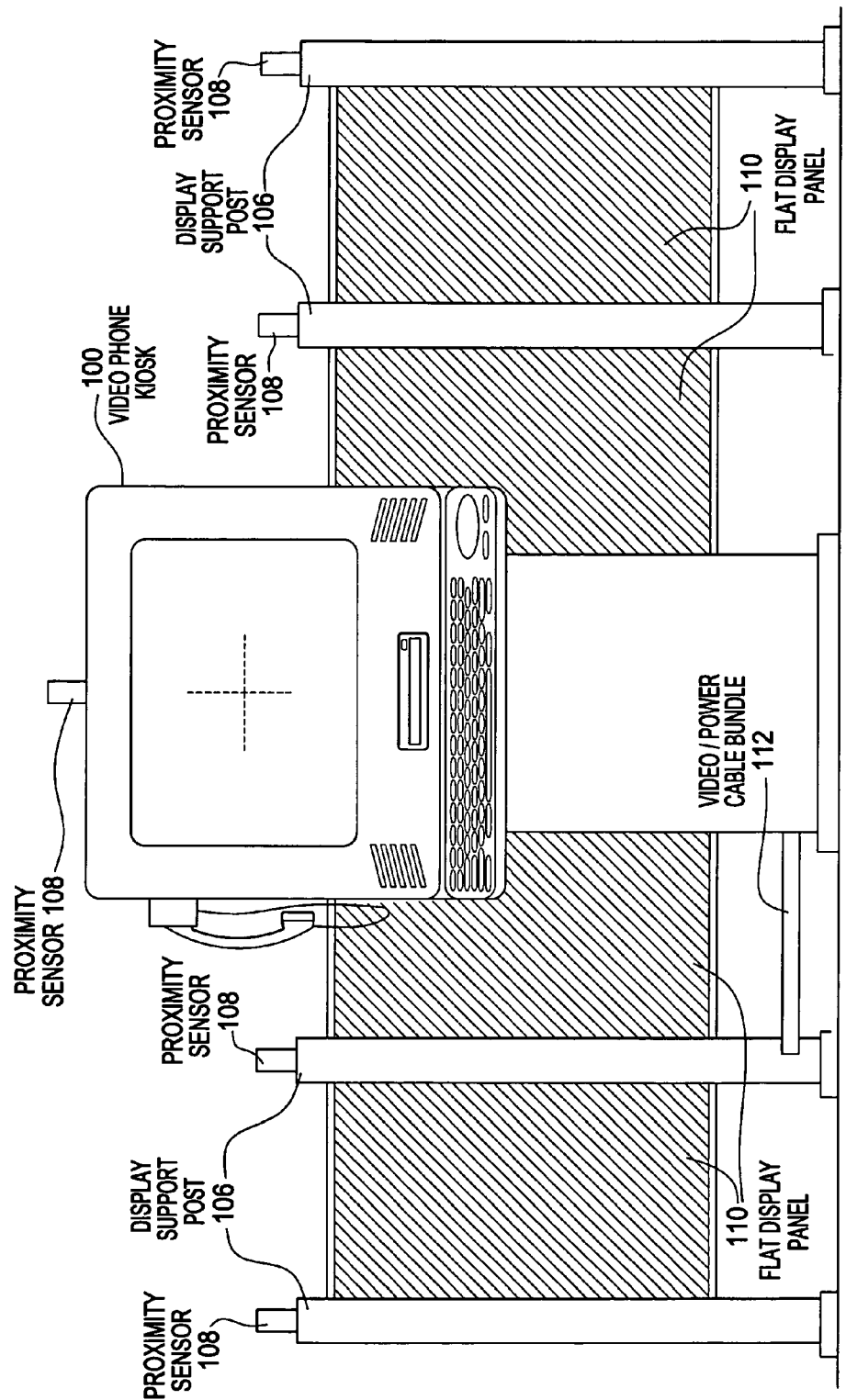
FIG. 8 is a front view of Video Phone Kiosk with Flat Attractor Display and Proximity Sensors.

FIG. 8 is a front view of the Video Phone Kiosk with the Flat Attractor Display and Proximity Sensors. The video phone kiosk 100 is aligned towards the back of the semi-octagon formed by the flat display panels 104, supported by the display support posts 106. The video phone kiosk 100 is tethered to the round display panels 104 with the video/power cable bundle 112 that extends into the display support panels 106. The video/power cable bundle 112 extends up the inside of the display support post 106 and then runs along the top of the flat display panel 110, underneath a cap that sits on top of the flat display panel 110, used for decoration and to hide and protect the video/power cable bundle 112. In this embodiment, a communications cable runs as part of the video/power cable bundle 112 to interconnect any and all proximity sensors 108 to the video phone kiosk 100, It should be noted that typical deployments only require one proximity sensor 108 to effectively manage customer detection. The primary sensor will be located on the top of the video phone kiosk 100 and does not require and external communications cable. Instead, if the proximity sensor 108 is located on one or more display support posts 106, then the communications cable will be included in the video/power cable bundle 112. The flat display panels 110 will contain some kind of flat display technology, such as LCD, LCoS, Plasma, flat CRT, or flexible display on polymer or plastic substrate. The backing will be composed of a firm material such as metal or composite wood, plastic, Kevlar™, or other material that can be formed and keep its shape indefinitely. Covering the visible portion of the round display panel is a layer of transparent glass, plastic or other material that protects the physical display underneath.

Figure 9:
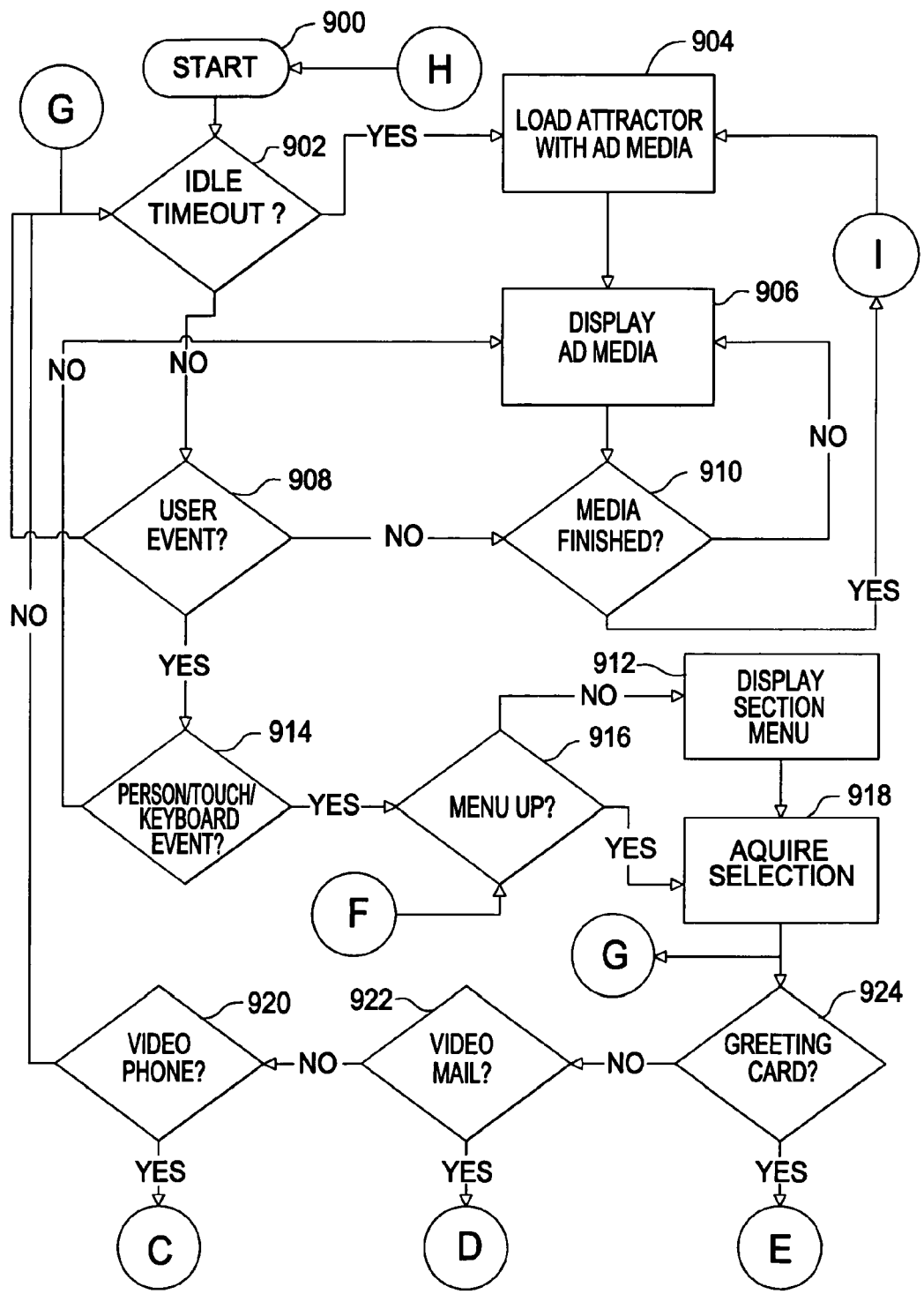
FIG. 9 is a flow chart of the top level Process Loop.
Figure 12:
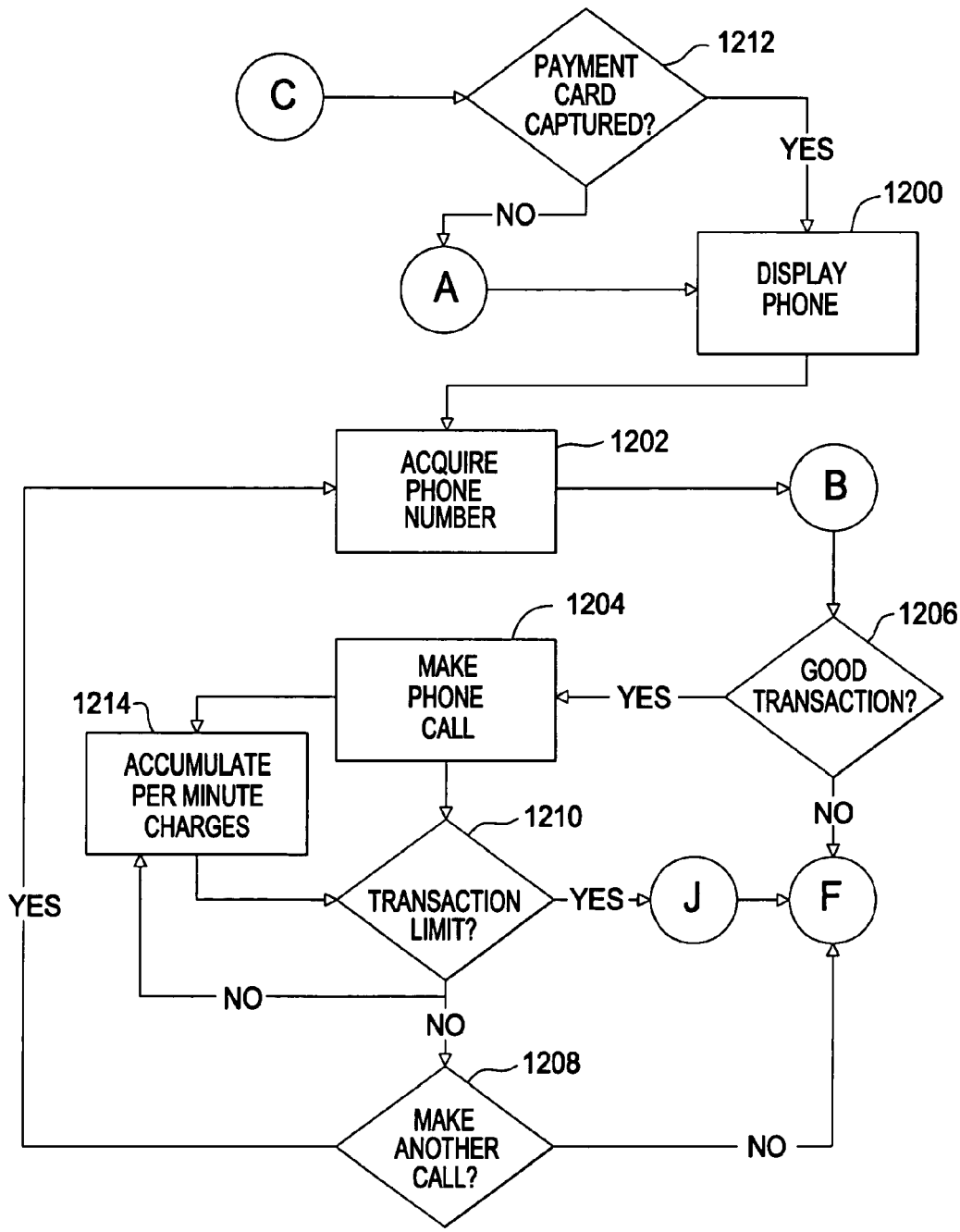
FIG. 12 is a flow chart of the Video Call Process Loop.
Figure 13:
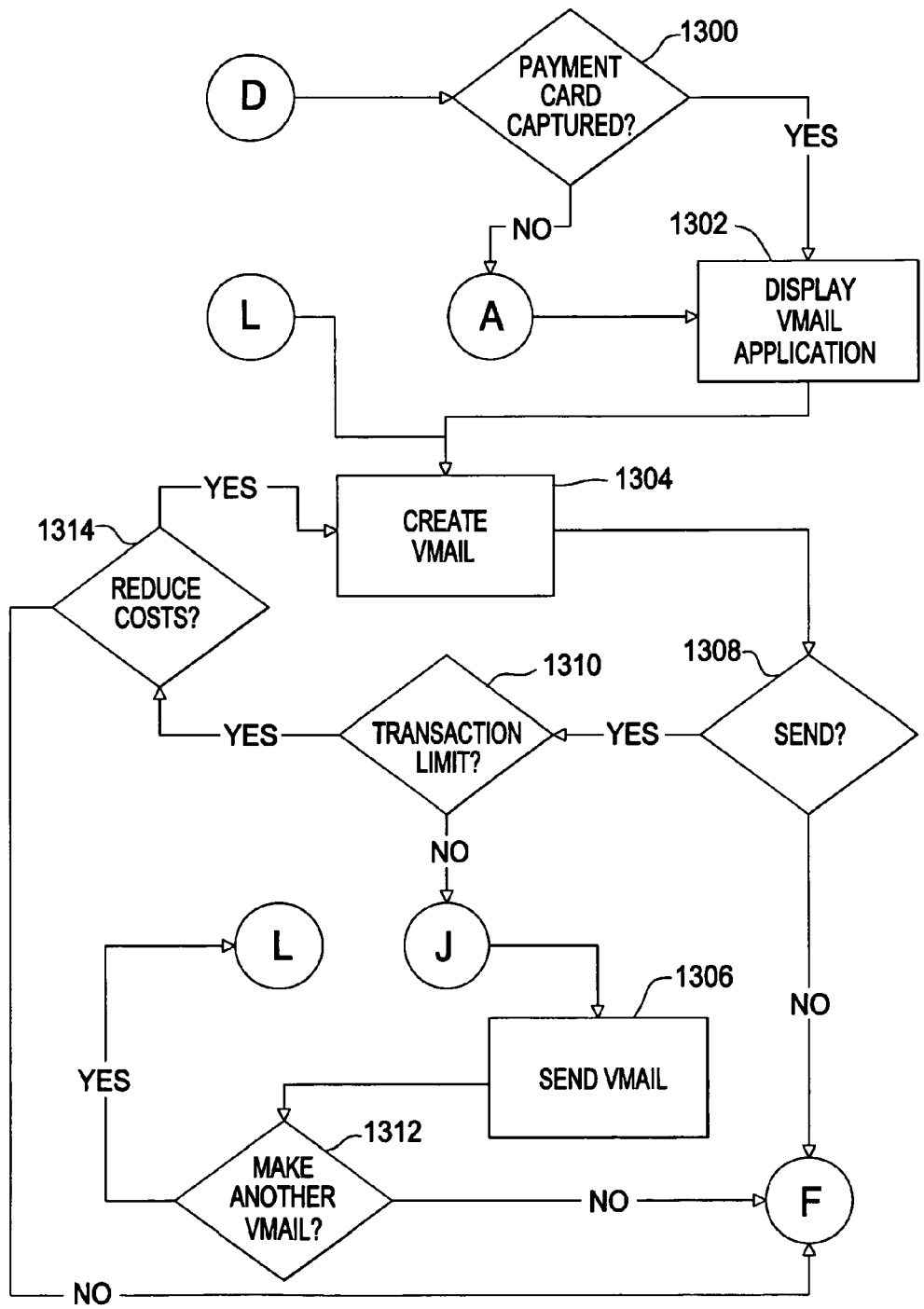
FIG. 13 is a flow chart of the Video Mail Process Loop.
Figure 14:
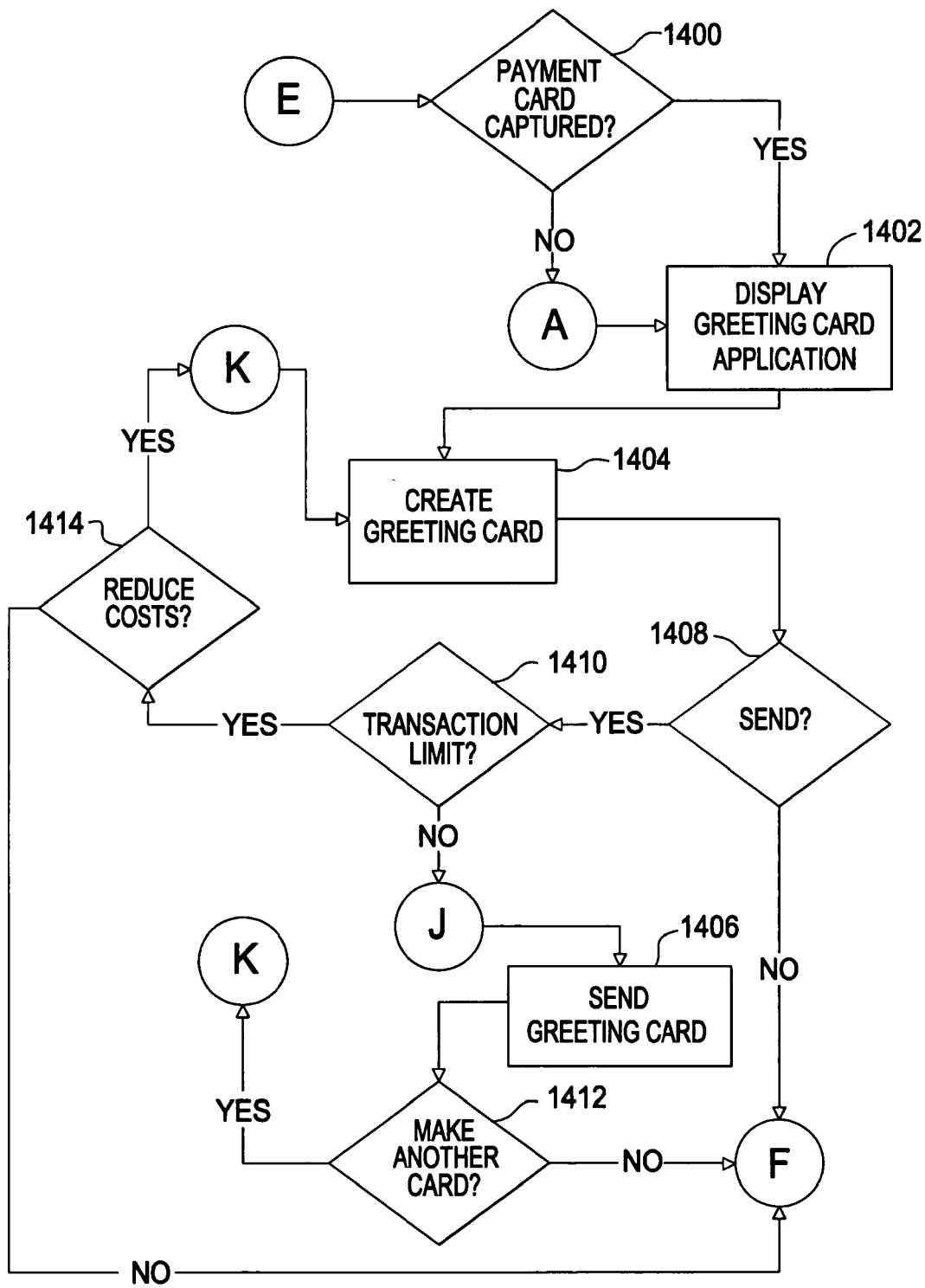
FIG. 14 is a flow chart of the Greeting Card Process Loop.

FIG. 9 is a flow chart diagram of the Top Level Process Loop. This is the top level process loop of the customer application in the video phone kiosk 100 (ref. FIGS. 1-8). By default the application tests for a time out condition noted in 902. If the condition is met, then the application will load the load the attractor with ad media 904 and proceed to display the ad media 906 on the video phone kiosk display 100 and the connected external display panels (either round display panels 104 or flat display panels 110). The application waits for completion of the ad media play 910. Once the ad media has finished display, a check is made for Maintenance (see FIG. 17) and the attractor returns to 904 and loads a new ad to display, before proceeding on to 906. At the same time, the application is testing for a predetermined user event 908. If the user event occurs, then the application tests for the kind of event (Person detected, Touch screen activated, or keyboard key pressed) 914. If the event is not a valid user event then application does not interrupt the current ad media being displayed. If the event is valid then the application checks to see of the customer menu is up 916. If the menu is not up, meaning that the attractor is still displaying ad media, then the application interrupts the attractor and displays the customer selection menu 912. The application acquires a selection from the customer 918 (while testing for a timeout condition 902) and tests the input for which function the customer is requesting. If the selection is a Greeting Card 924 then the application branches to 1400 (FIG. 14). If the selection is Video Mail 922 then the application branches to 1300 (FIG. 13). If the selection is Video Phone, then the application branches to 1212 (FIG. 12). If the selection is none of the previous options, then the selection is ignored and the application drops into waiting for a timeout condition 902 after all user events are processed.

Figure 10:
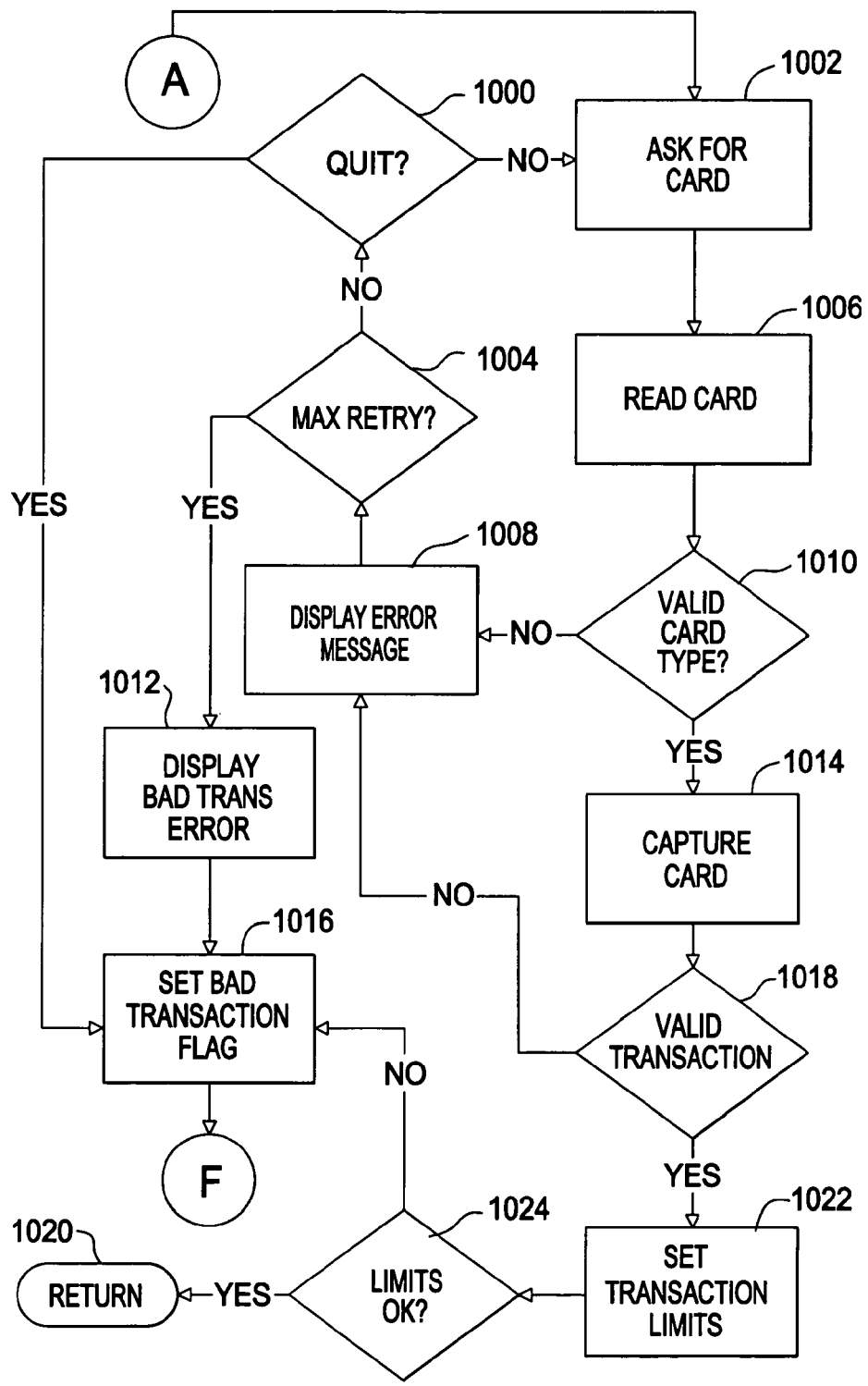
FIG. 10 is a flow chart of the Payment Card Capture Process.

FIG. 10 is a flowchart diagram of the Payment Card Capture Process. This process is part of the customer application. Whenever the application requires a payment card, it transfers to 1002 where the customer is asked for a payment card. The customer inserts a payment card and the application reads the information from the card 1006. The application then checks the card to make sure it is one of the valid card types that is accepted by the customer application 1010. If the card is valid, then the application will submit the card to the merchant account/bank for capture 1014, and check to make sure the transaction is accepted 1018. If the transaction is accepted, the application sets the transaction limit 1022 and checks to make sure these limits are OK 1024 before returning to the calling portion of the customer application 1020.

Returning to 1010, if the credit card is not valid, then the customer application will display an error message 1008 and check to see if the customer can try to swipe card again 1004. If the customer can retry the card again the customer application checks to see if the customer has canceled the transaction 1000. If they have, then the application sets the bad transaction flag 1016 and returns to the calling section of the customer application 1020. If the customer wants to try their card again 1000, then the application loops back to 1002 and starts the flat rate process loop again. Returning to 1004, if the customer has exceeded the number of retries allowed, the customer application displays a bad transaction error 1012 and sets the bad transaction flag 1016 before returning to 916 (FIG. 9).

Figure 11:
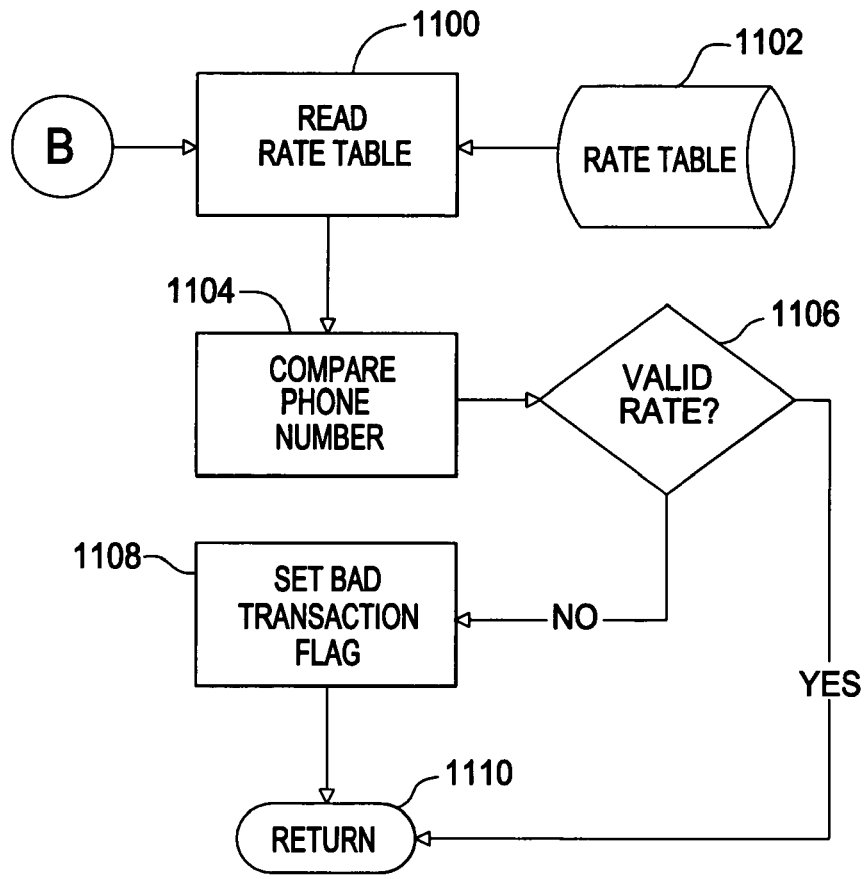
FIG. 11 is a flow chart of the Rate Table Process.

FIG. 11 is a flowchart diagram of the Rate Table Process. The rate table process of the customer application handles calling rates on the video phone for long distance and international calling. When the customer application receives a phone number to dial it transfers to 1100 where the application reads the rate table 1102. The phone number is compared 1104 to valid area codes, number plan area (NPA) and country codes to see if there is a rate for the number requested. If the rate is valid 1106, then the application returns to the calling section 1110 of the customer application. If the rate is invalid, the bad transaction flag is set 1108 and the application returns to the calling section of the customer application 1110.

FIG. 12 is a flowchart diagram of the Video Call Process Loop. When the customer application transfers from 920 (FIG. 9), a check is run to see if the payment card has been captured. 1212. If not, then the application captures the payment card 1002 (FIG. 10). Before the phone application is displayed 1200. The phone number to call is acquired 1202 and the rate table is then consulted to validate the phone number 1100 (FIG. 11). If the bad transaction flag is set 1206, the application returns back to 916 (FIG. 9; otherwise the phone call is made 1204. While the phone call is in progress the customer application accumulates per minute charges and checks the current charge against the transaction limits 1210. When the cost of the call meets or exceeds the transaction limits 1210, the call is terminated and charges are posted to the merchant account/bank 1800 (FIG. 18) before returning to 916. Once the phone call is completed, the call charge is checked against the transaction limits 1210. If the transaction limit is not reached or exceeded 1210, the customer is given the opportunity to make another video call 1208. If they agree, then the application loops back to 1202, otherwise control returns back to 916.

Figure 18:
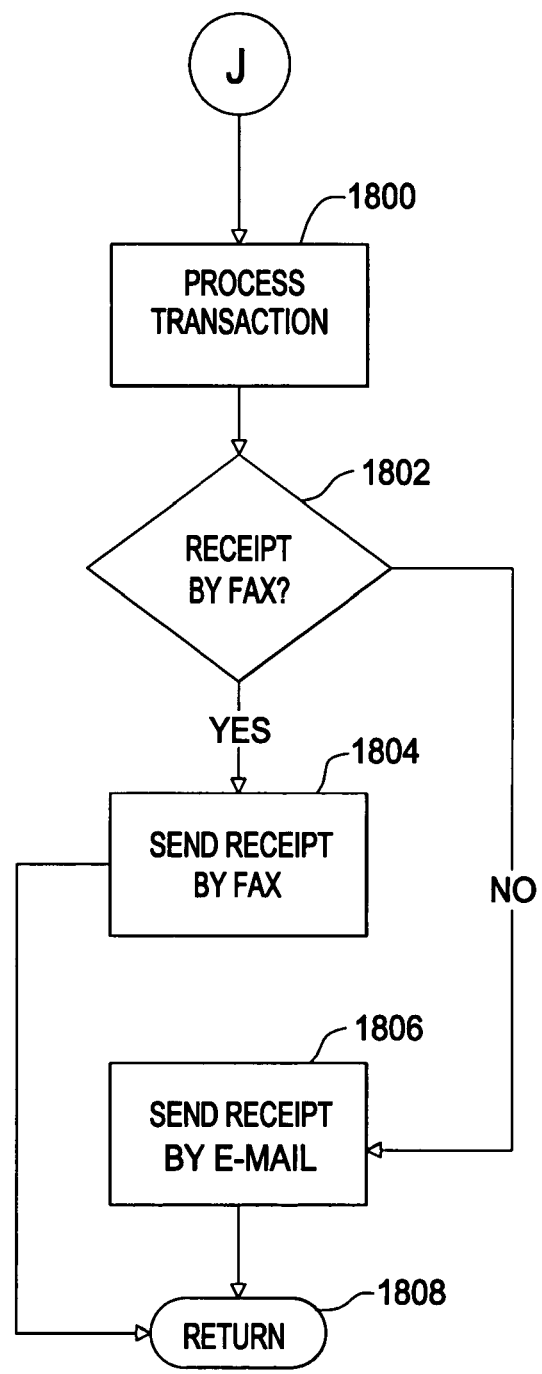
FIG. 18 is a flow chart of the Payment Card Process.

FIG. 13 is a flowchart diagram of the Video Mail Process Loop. When the customer application transfers from 922 (ref. FIG. 9), a check is run to see if the payment card has been captured 1300. If not, then the application captures the payment card 1002 (ref. FIG. 10). Before the video mail application is displayed 1302. The customer creates the video mail 1304, and is given the choice to send it or cancel 1308. If the customer chooses not to send the video mail, then control returns back to 916 (ref. FIG. 9), otherwise the charge for the video mail is checked against the transaction limit 1310. If the transaction limit is exceeded, then the customer is asked if they want to reduce their costs or quit 1314. If the customer wants to reduce costs, then control is passed back to 1304, otherwise control is passed back to 916 (ref. FIG. 9). If the transaction limit is not exceeded, then charges are posted to the merchant account/bank 1800 (ref. FIG. 18) and the video mail is sent out to the recipient. Next, the customer is given the option to send another video mail 1312. If they agree to send another video mail, the application loops back to 1304, otherwise control returns back to 916 (ref. FIG. 9).

FIG. 14 is a flowchart diagram of the Greeting Card Process Loop. When the customer application transfers from 924 (ref. FIG. 9), a check is run to see if the payment card has been captured 1400. If not, then the payment card is captured 1002 (ref. FIG. 10) before the greeting card application is displayed 1402. The customer creates the electronic greeting card 1404, and is given the choice to send it or cancel 1408. A printed greeting card could also be created at the local kiosk printer. If the customer chooses to send the greeting card 1408, the charge for the greeting card is checked against the transaction limit 1410. If the transaction limit is exceeded 1410, then the customer is asked if they want to reduce the costs on the card or quit 1414. If the customer wishes to reduce charges, then control is passed back to 1404 to change the greeting card. If the customer wants to quit, then control is passed back to 916 (ref. FIG. 9). If the transaction limit is not exceeded, charges are posted to the merchant account/bank 1800 (ref. FIG. 18) and greeting card information is sent to fulfillment house 1406. The customer is given the option to make another greeting card 1412. If they agree to make another greeting card, the application loops back to 1404, otherwise control returns back to 916 (ref. FIG. 9).

Figure 15:
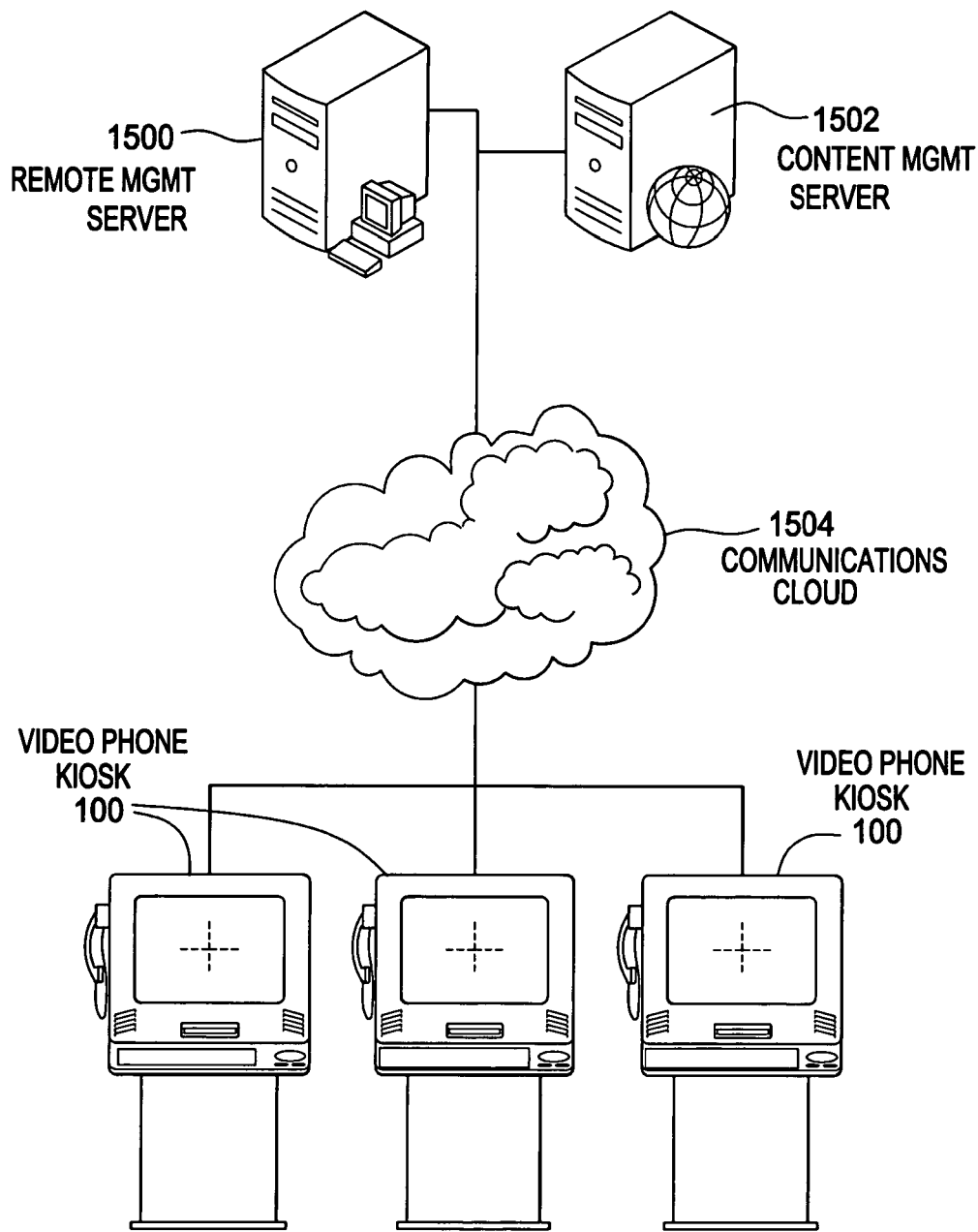
FIG. 15 is a system view of the Remote and Content Management for Video Phone Kiosks.

FIG. 15 is a system view of the Remote and Content Management for Video Phone Kiosks. It depicts the connection between the Remote Management Server 1500, the Content Management Server 1502 and video phone kiosks 100. The remote management server 1500 and content management server 1502 are connected to the communications cloud 1504. The communications cloud is connected to the video phone kiosks 100.

Figure 16:
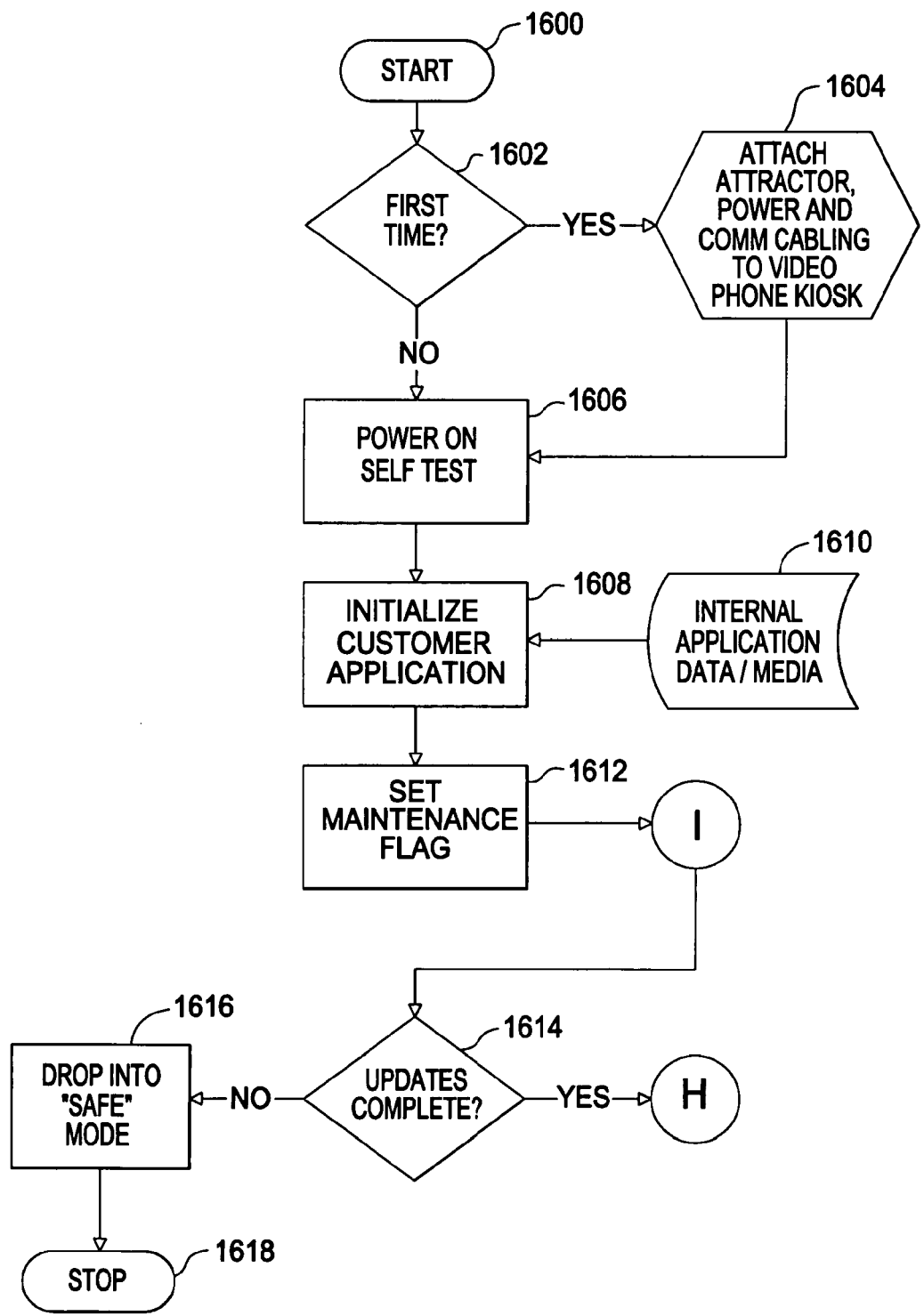
FIG. 16 is a flow chart of the Initialize Video Phone Kiosk Process.
Figure 17:
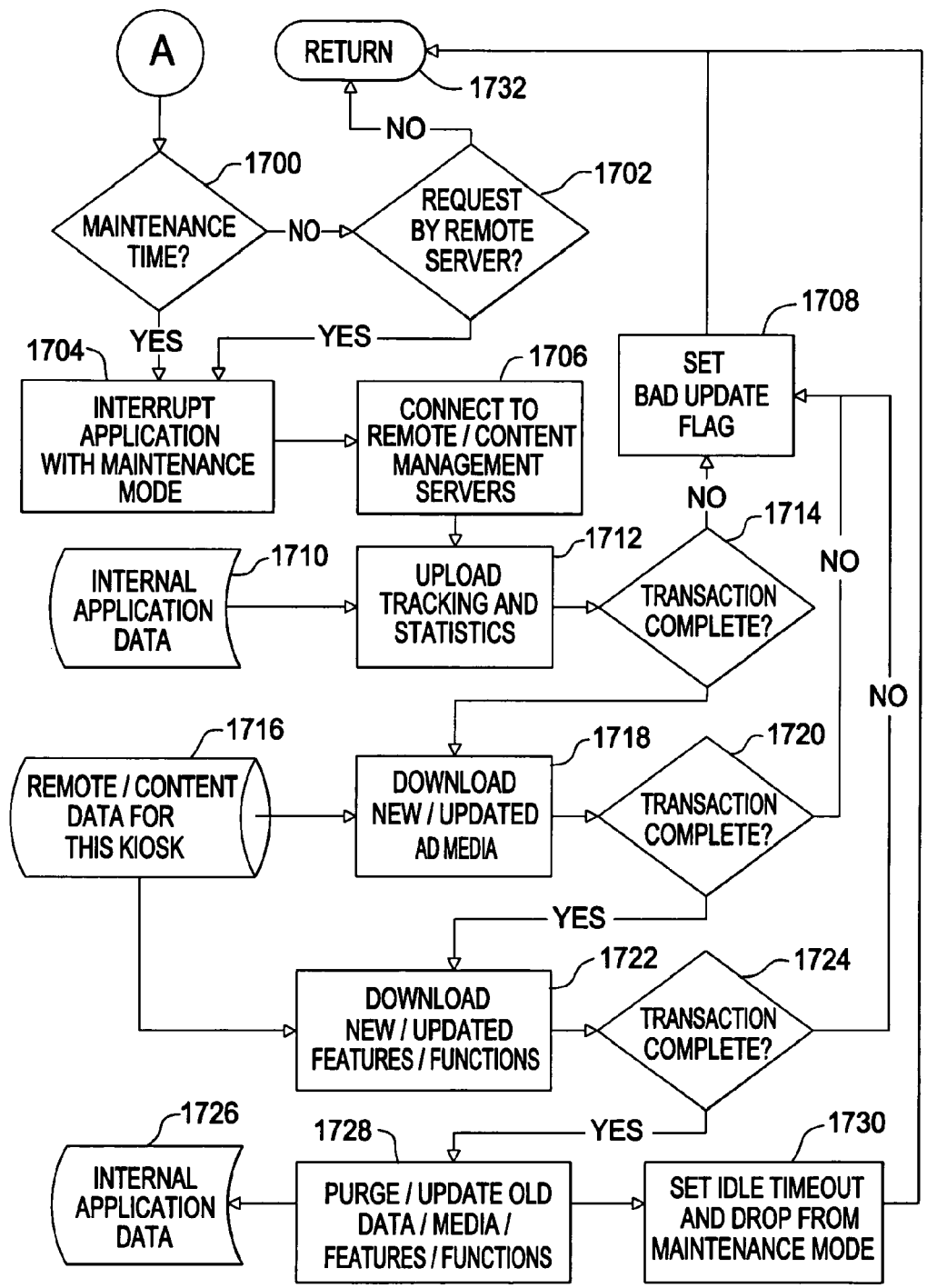
FIG. 17 is a flow chart of the Video Phone Kiosk Maintenance Process.

FIG. 16 is a flowchart diagram of the Initialize Video Phone Kiosk Process. If this is the first time the video phone kiosk is placed into operation 1602 then the video phone kiosk 100 will be installed and attached to the attractor, power and communications cabling necessary for operations prior to initial startup 1604, otherwise, the video phone kiosk 100 will be power cycled to start the Power On Self Test (POST) 1606. Once the POST 1606 is completed the customer application will be initialized 1608 and load its configuration and operating data, plus any media ad files stored internally 1610. Once completed, the customer application will set the maintenance mode flag 1612 and transfer to Maintenance Mode to receive updates 1700 (ref. FIG. 17). If the updates are complete 1614, then control is transferred to the Top Level Process Loop 900 (ref. FIG. 9), otherwise, the customer application drops into a "safe mode" 1616 and halts operations 1618.

FIG. 17 is a flowchart diagram of the Video Phone Kiosk Maintenance Mode Process. Once the customer application transfers control to maintenance mode, the application checks to see if it is time to run maintenance 1700. If not, then the application checks to see if a request was made by a remote server 1702. If not, then control is returned to the customer application. If it is maintenance time 1700, and/or requested by a remote server 1702, then the customer application is suspended and control switched to maintenance mode 1704. Next the application connects to the remote and content management servers 1706. Once connection is established, any tracking and statistics store internally 1710 are reported back 1712. If the transaction was not successful 1714, then the application sets the bad update flag 1708 and returns to caller 1732, otherwise the application downloads new and updated ad media 1718 from the content management server 1716. If the download was not successful 1720, then the application sets the bad update flag 1708 and returns to caller 1732, otherwise the application downloads new and updated features and functions 1722 from the remote management server 1716. If the download was not successful

1724, then the application sets the bad update flag 1708 and returns to caller 1732, otherwise the application purges/updates old data, media, features and functions 1728 stored internally 1726, sets the Idle Timeout and drops from maintenance mode 1730 before returning to caller 1732.

FIG. 18 is a flowchart diagram of the Payment Card Process. Once the customer application transfers to the payment card process, the pending transaction is processed through the merchant account/bank to commit the pending charges 1800. Next the application asks if receipt delivery is to be by fax 1802. If the customer selects fax, then the receipt for all committed charges is sent to the fax number 1804, which is provided by the customer before returning to caller, otherwise the receipt for all committed charges is sent to the e-mail address 1806 provided by the customer before returning to caller 1808.

Figure 19:
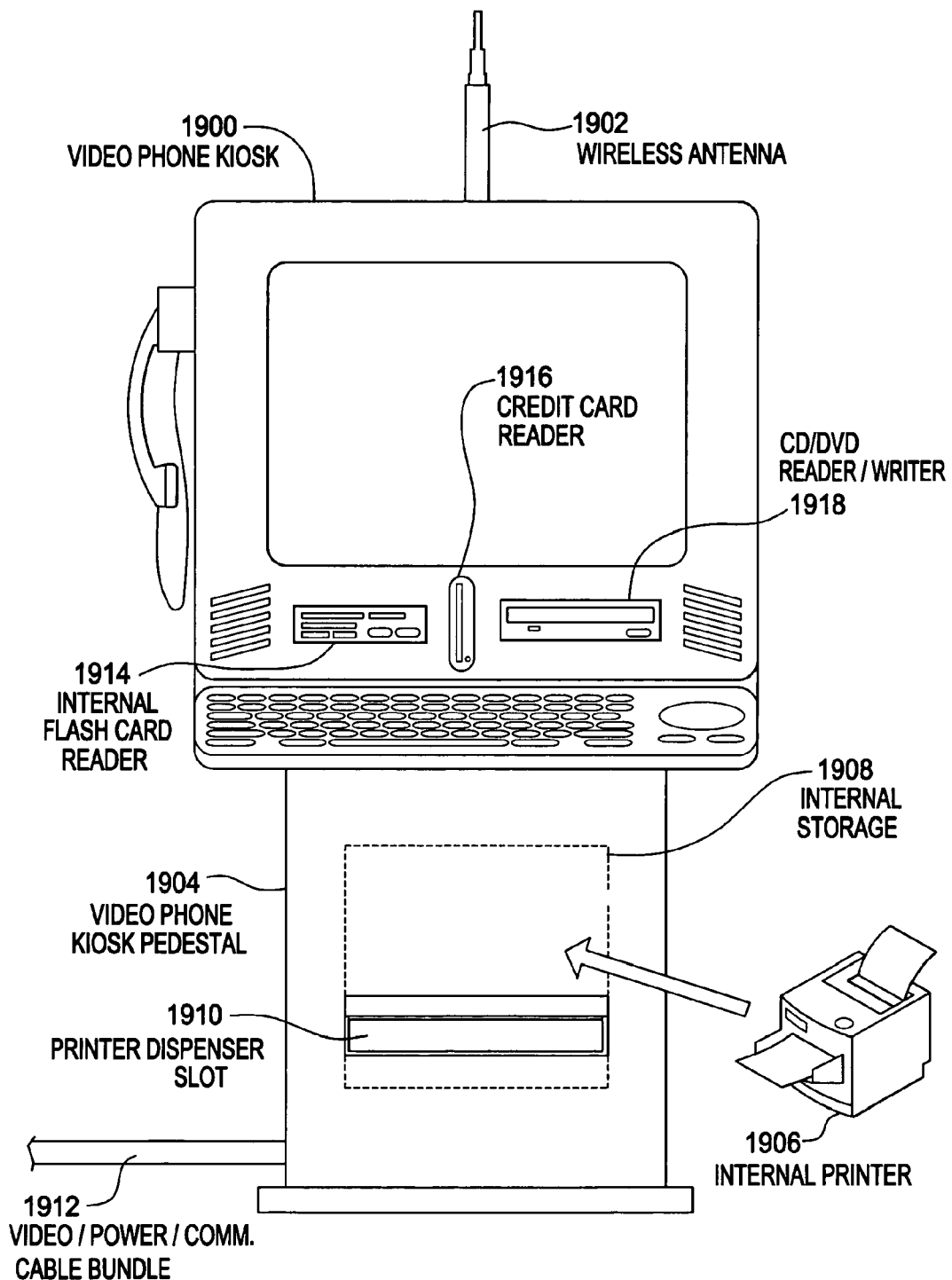
FIG. 19 is a front view of the Expanded Services Kiosk.

FIG. 19 is a front view of the Expanded Services Kiosk. The Video Phone Kiosk 1900 is attached to the Video Phone Kiosk Pedestal 1904. The Video Phone Kiosk Pedestal 1904 has an Internal Storage 1908 space that is used to mount an Internal Printer 1906 of any type to dispense media output such as copy paper, colored paper, coupons, receipts, photographs, banners, velum, and any other media type that fits in the printer and satisfies the services provided. On the front of the Video Phone Kiosk Pedestal 1904 is a Printer Dispenser Slot 1910 used to dispense the output from the Internal Printer 1906 to the customer. At the back bottom left of the Video Phone Kiosk Pedestal 1904, the Video/Power/Communications Cable Bundle 1912 exits the Video Phone Kiosk Pedestal 1904 to attach to an attractor, a power source, and an external communications connection, if required. The Video Phone Kiosk 1900 has a number of enhancements applied to it for enhanced services. In the front panel on the left (facing from the front), is an Internal Flash Card Reader 1914 that is capable of reading most of the currently popular card formats, which can include CF Types 1 & 2, xD, XDM, SM, mSD, SD, MMC, MS Pro, Pro Duo, among others. On the right side of the Video Phone Kiosk 1900 front panel is a CD/DVD Reader/Writer 1918, which is capable of both reading and writing CD and DVD media, which can include the new High Definition formats (HD-DVD and/or BlueRay). On the top of the Video Phone Kiosk 1900, is an optional Wireless Antenna 1902 to facilitate communications with an external wireless access point, in place of a wired connection to an external communications connection.

FIG. 20 is a top view of the Biometric Keyboard 2000. The Biometric Keyboard 2000 is composed of a QWERTY keypad 2002, a trackball 2004, a Finger Print Reader 2006, a left Mouse Button 2008, and Right Mouse Button 2010.

Figure 21:
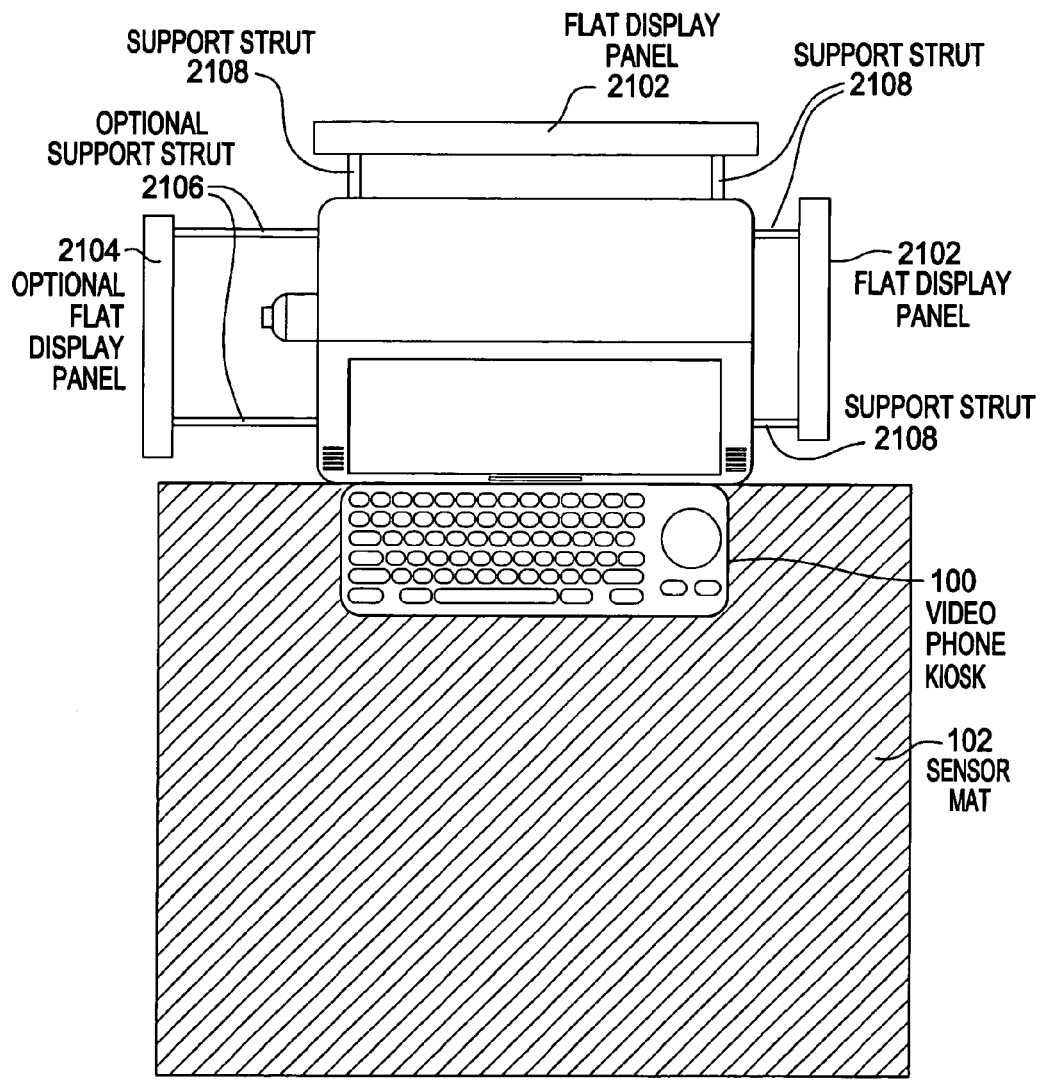
FIG. 21 is a top view of Video Phone Kiosk with Attractor Wing Display and Sensor Mat.

FIG. 21 is a top view of the Video Phone Kiosk with Attractor Wing Display and Sensor Mat. The Video Phone Kiosk 100 is positioned directly behind the Sensor Mat 102. Attached to both the right and the back of the Video Phone Kiosk 100 are Flat Panel Displays 2102, which are attached to Video Phone Kiosk 100 by Support Struts 2108. The left side of the Video Phone Kiosk has room for an Optional Flat Display Panel 2104, that is attached by means of an Optional Support Strut 2106.

Figure 22:
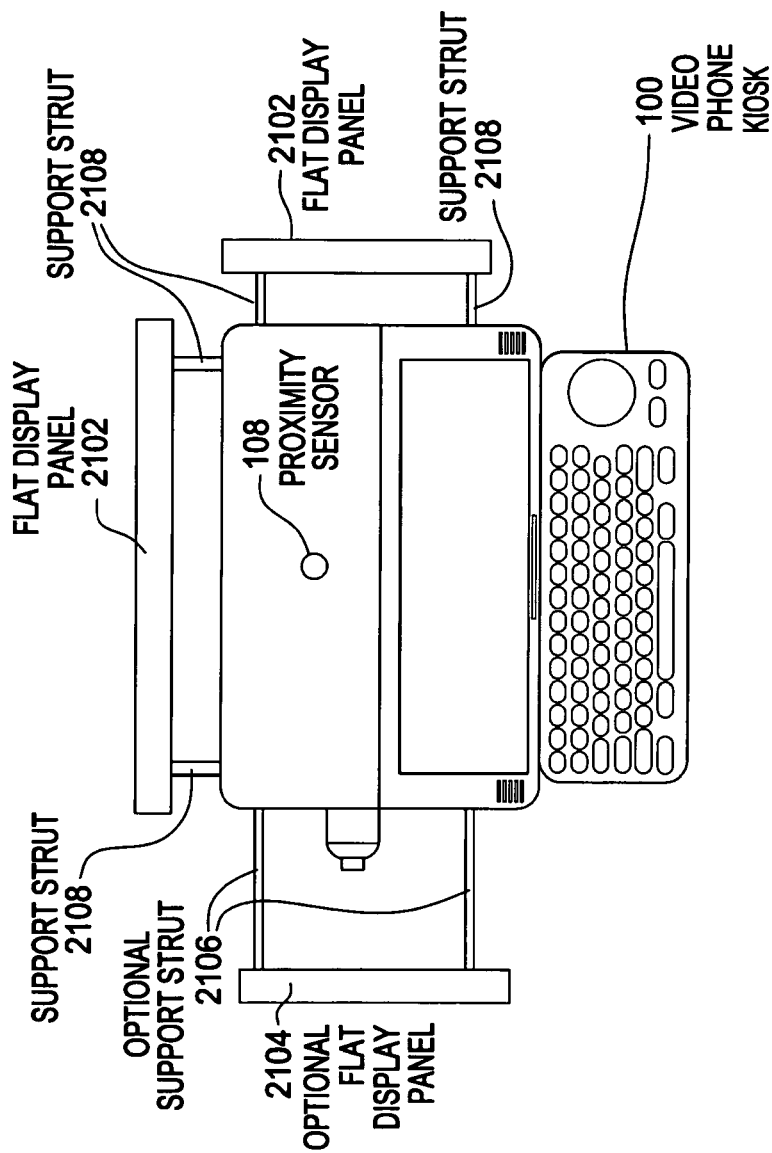
FIG. 22 is a top view of Video Phone Kiosk with Attractor Wing Display and Proximity Sensors.

FIG. 22 is a top view of the Video Phone Kiosk with Attractor Wing Display and Proximity Sensor. The Video Phone Kiosk 100 is free standing with no physical attractor surrounding it. The Proximity Sensor 108 is attached to the top of the Video Phone Kiosk 100. Attached to both the right and the back of the Video Phone Kiosk 100 are Flat Panel Displays 2102, which are attached to Video Phone Kiosk 100 by Support Struts 2108. The left side of the Video Phone Kiosk has room for an Optional Flat Display Panel 2104, that is attached by means of an Optional Support Strut 2106.

Figure 23:
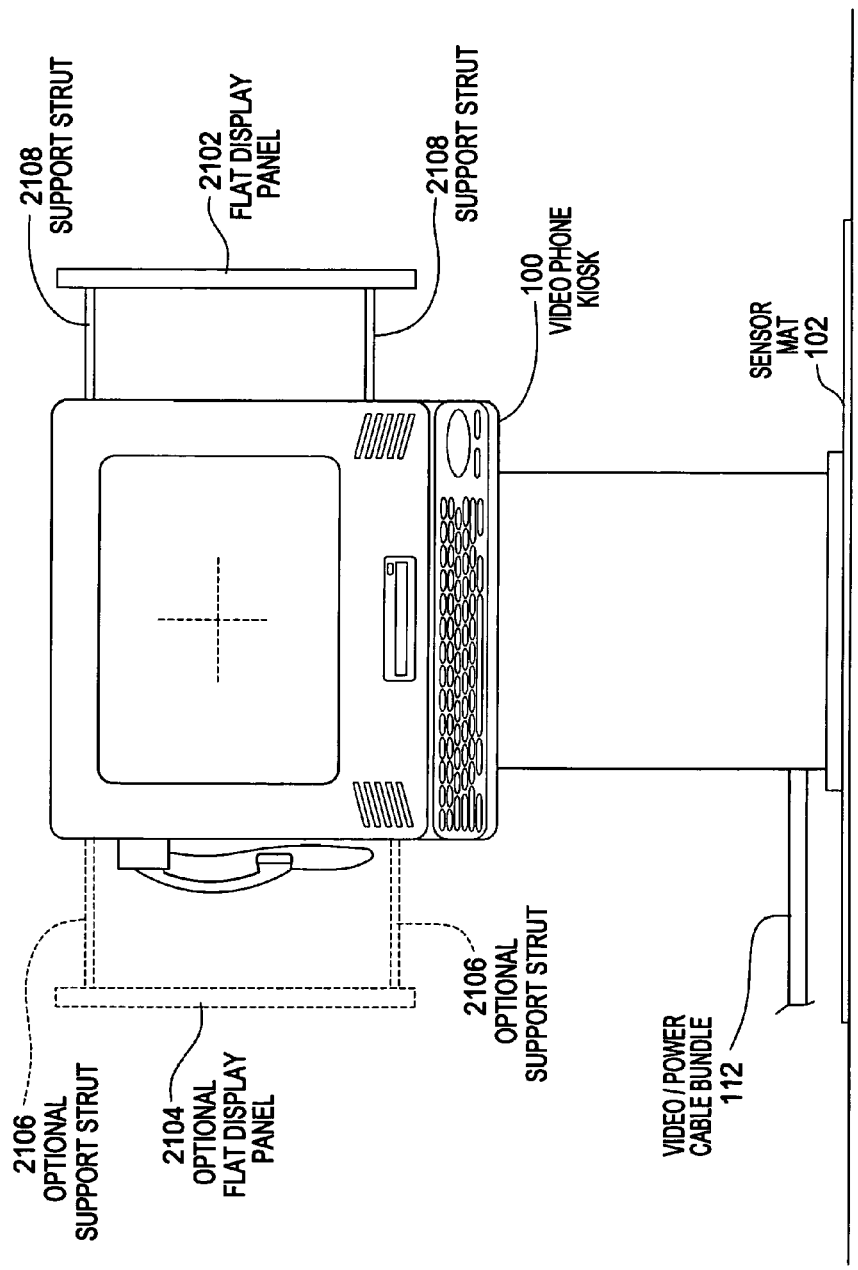
FIG. 23 is a front view of Video Phone Kiosk with Attractor Wing Display and Sensor Mat.

FIG. 23 is a front view of the Video Phone Kiosk with Attractor Wing Display and Sensor Mat. The Video Phone Kiosk 100 is positioned directly behind the Sensor Mat 102. Attached to the right side of the Video Phone Kiosk 100 is Flat Panel Display 2102, which is attached to Video Phone Kiosk 100 by Support Struts 2108. The left side of the Video Phone Kiosk has room for an Optional Flat Display Panel 2104, that us attached by means of an Optional Support Strut 2106. The Video/Power Cable Bundle 112 exits the bottom left of the Video Phone Kiosk to attach to external power and communications sources.

Figure 24:
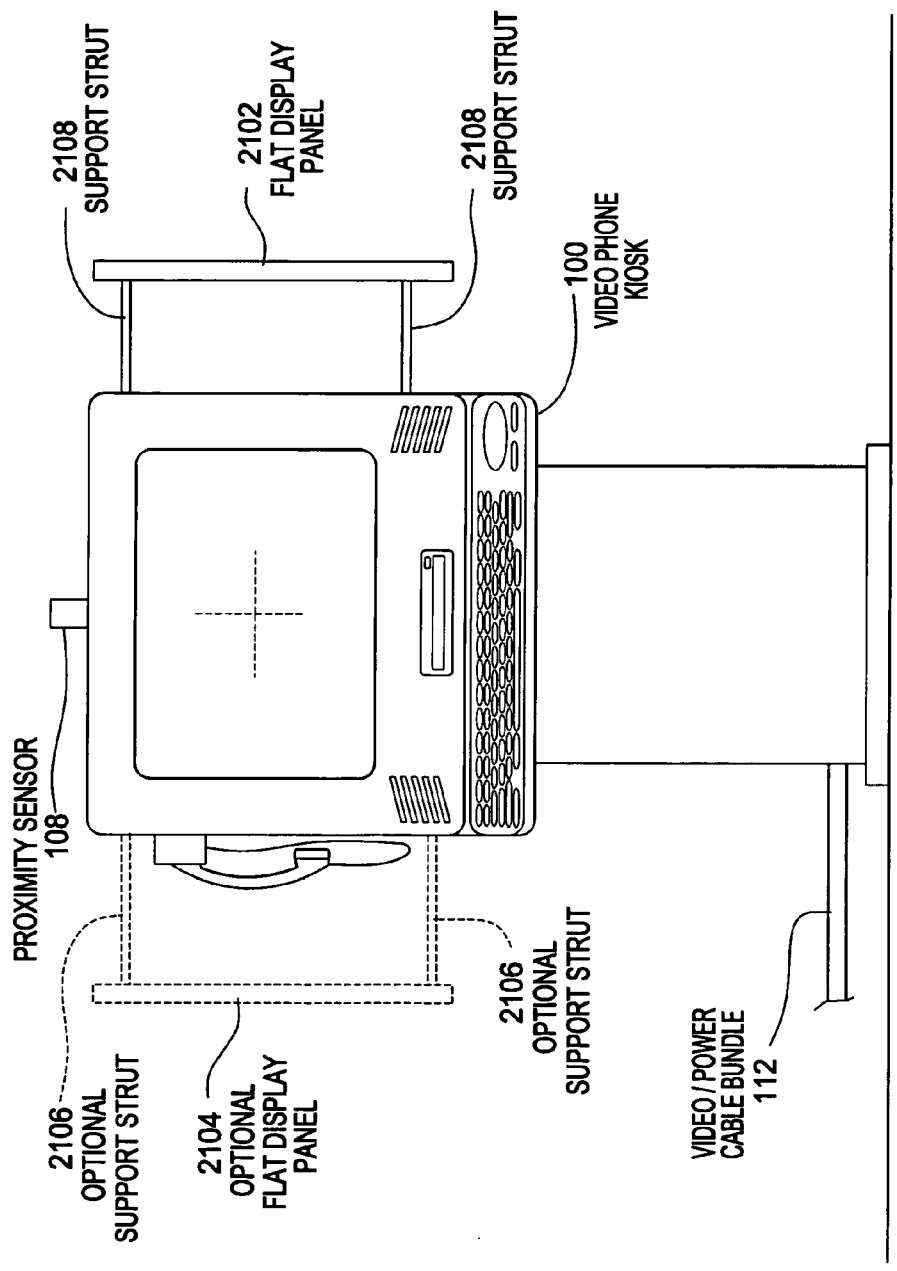
FIG. 24 is a front view of Video Phone Kiosk with Attractor Wing Display and Proximity Sensors.

FIG. 24 is a front view of the Video Phone Kiosk with Attractor Wing Display and Proximity Sensor. The Video Phone Kiosk 100 is free standing with no physical attractor surrounding it. The Proximity Sensor 108 is attached to the top of the Video Phone Kiosk 100. Attached to the right side of the Video Phone Kiosk 100 is Flat Panel Display 2102, which is attached to Video Phone Kiosk 100 by Support Struts 2108. The left side of the Video Phone Kiosk has room for an Optional Flat Display Panel 2104, that is attached by means of an Optional Support Strut 2106. The Video/Power Cable Bundle 112 exits the bottom left of the Video Phone Kiosk to attach to external power and communications sources.

System Operation:

The following is a description of the system operation of the present invention. In operation, the video phone kiosk 100 as described herein works in several states, namely initialization, idle, active and maintenance. When the video phone kiosk 100 is first installed, there are a number of requirements that need to be met prior to powering it on for the first time. These are described as follows:

1) The Attractor must be installed first with all cabling for power video and communications for its internal hardware attached and operational;
2) Power cabling for the kiosk must be ready to attach;
3) A broadband connection of sufficient speed must be available and active; and
4) A maintenance account must be established and populated for the video phone kiosk 100.

Once these requirements are met and the associated power and communications are attached, then the video phone kiosk will power up for the first time into Initialization Mode.

Initialization Mode starts (ref. FIG. 16), in essence, with the Power On Self Test (POST) of the computer hardware 1606. Once completed, the host operating system and its environment are bootstrapped into an operational state before the customer application is initialized 1608. Once the customer application starts the initialization process, it configures its operation and features from internal data 1610 that is stored on the computer. This data can be a default set of data, if the video phone kiosk 100 is being started for the first time, or it may contain an image of data generate from the last time it was in operation before being interrupted. In either condition, it is necessary to move the operation of the video phone kiosk 100 and its internal dataset with ad media to a known good state before allowing customers to use the pay services. This resetting reduces the chance of a faulty transaction or service being visited on the customer.

Once the customer application is fully operation with the current data set supplied from internal storage 1610, the application sets the Maintenance Flag 1612 and enters Maintenance Mode (ref. FIG. 17). In this mode there are two events that will cause this process to operate; 1) the Maintenance Flag being set, and 2) a remote request by the Remote Management and/or Content Management servers.

The Maintenance Mode Flag allows the use of Maintenance Mode independent of remote configuration by providing for internal operational events to trigger the use of this mode. For example, the Maintenance Mode flag can be set by any number of conditions including the following: A) a specified period of time between the last Maintenance Mode update B) completed execution and display of all ad media currently on hand C) internal error generated from faulty or incorrect data D) detection of new or changed hardware installed E) detection of new or changed software drivers installed F) detection of changes in host software and/or configuration environment G) changes in applications H) specific calendar date events I) Specific clock time events J) non-catastrophic hardware failures K) support applications requiring updates L) host software environment (including operating system) requiring updates. Use of the Maintenance Mode flag allows the video phone kiosk 100 to pull information and updates it needs without the remote management and content servers requiring a constant awareness as to its state of operation.

A remote request by the Remote Management and/or Content Management servers 1702 allows the use of Maintenance Mode from a external event in order to better manage video phone kiosks 100 both individually and in groups, using the existing network connection as the means to keep deployed units in sync by using a push model to move information out to one or many video phone kiosks 100 at the same time. For example, updates to the host operating system cannot be arbitrarily sent out to production video phone kiosks 100 in the field, as the interaction with the customer application and the updates are unknown. After sufficient testing to verify there are no bad side effects to using the updates, the remote management server 1500 will be used to send a request to each of the production video phone kiosks 100 in the field and update them with the changes. An example of content updates is as follows. An advertiser wants to update their ad media on all the east coast video phone kiosks 100. The new ad media is loaded on the content management server 1502 and the targeted video phone kiosks 100 are updated with the new ad media, while the rest of the video phone kiosks 100 are left unchanged.

With the Maintenance Mode set, the Maintenance mode flag test passes 1700 and the customer application is interrupted 1704 so that updates can taker place. Next the application connects to the Remote and Content Management servers 1706 and uploads and tracking and statistics data that has been accumulated in operation 1712. If this the first time in operation for the video phone kiosk 100, then the data will be zeroed out to reflect the lack of operation time. Once the tracking and statistics are uploaded 1712, a test is made to confirm a successful transaction 1714. If the transaction failed 1714, then the bad update flag is set 1708 and the process returns to caller 1732, otherwise the application proceeds to download any new and updated ad media 1718. Once it has completed the download of new and updated ad media 1718 a test is made for a successful transaction 1720. If the transaction failed 1720, then the bad update flag is set 1708 and the process returns to caller 1732, otherwise the application proceeds to download any new and updated application features and functions 1722.

Once it has completed the download of new and updated application features and functions 1722, a test is made for a successful transaction 1724. If the transaction failed 1724, then the bad update flag is set 1708 and the process returns to caller 1732, otherwise the application proceeds to Update and Purge old data, media, application features and functions 1728, storing the results internally 1726 on the local hard drive. Finally, the process sets the Idle Timeout flag and drops out of maintenance mode 1730 before returning to caller 1732.

Returning from Maintenance Mode, the customer application checks to see if the updates were successful 1614 (ref. FIG. 16). If they were not, the customer application shuts down and drops in "Safe" mode 1616, where it does not allow customers to use the video phone kiosk 100 and attempts to notify someone locally through the display and via the network (most likely through e-mail) that the updates did not succeed. If the updates did succeed 1614, then control transfers to 900 (ref. FIG. 9) where the top level process loop takes over in a default state of idle.

When the video phone kiosk 100 first starts in Idle state (see FIG. 9) the video phone kiosk 100 loads the first of the ad media 904 into the attractor and starts to display or play the ad media 906. Once the ad media display has finished 910, it will loop back and load the next ad in the list and commence to play that ad until a user event 908 is encounter or it finishes that ad and continues to move on through the ad media list, loading 904 and playing 906 each one. Once the list has completed, the attractor starts back at the top of the list and loads 904 and plays 906 each one again. The ad media itself can be composed of either still images, still images with audio, movie clips, stills with embedded movie clips, and so forth. The attractor can support many media formats which can include JPEG, TIFF, BMP, and PNG still images. Moving picture formats can include MPEG2, AVI, Quicktime, Flash, Windows Media, Theora, H.263 and MPEG4. Audio formats can include WAV, AAC, MP3, and OGG. The attractor will display up to six copies of the same ad media at the same time. This is accomplished through the use of simultaneous video streaming to display panels (104 and 110) located in the attractor that receive same video stream as the main screen on the video phone kiosk.

As the ad media plays in the attractor 906, the customer application is also looking for a user event 908. A user event falls into one of three categories: 1) Proximity detection 2) Touch screen and 3) Keyboard/mouse events. Proximity detection involves the use of proximity sensors (one or more) 108 located on the attractor or the video phone kiosk 100. See FIGS. 2, 4, 6, and 8 for examples of proximity sensor 108 placement. When a customer walks within range of the proximity sensor(s) 108, or touches the keyboard/mouse, or touches the screen on the video phone kiosk 100 an interrupt is triggered that alerts the customer application 908 that a user event has just occurred 914. If for some reason a user event interrupt is triggered and the event itself is not recognized as one of the valid events, then the customer application swallows the event and continues on with the ad media display 906.

The customer application now moves into Active mode. The customer application checks to see if the main selection menu is up 916. If the attractor was running at the time the event occurred, then customer application will remember what ad media was running at the time and save it for later. Then the customer application will display the main selection menu 912 and acquire a selection from the customer 918. Now that the customer is engaged with the customer application, all future interrupts from the proximity sensor(s) 108, touch screen and keyboard/mouse for the purpose of triggering a user event 908, will be ignored till the customer application moves back into Idle state or the customer does not interact with the video phone kiosk 100 fast enough to trigger a timeout condition 902 and move the customer application back into Idle state which started the attractor loading 904 and playing 906 its list of ad media.

Once the customer has made a section through the touch screen and/or keyboard, the customer application evaluates the selection. If the selection is for greeting cards 924, then control transfers to the greeting card application 1400 (FIG. 14). If the selection is for video mail 922, then control transfers to the video mail application 1300 (FIG. 13). If the selection is for the video phone 920 then control passes to the video phone application 1200 (FIG. 12). If the customer makes a selection that is not valid, the customer application will swallow the selection and do nothing while restarting the timeout counter. The timeout counter in this situation keeps the machine for waiting forever for the customer to make a valid selection. For example, the customer could walk up to the kiosk, generating a person event, make an invalid selection on the keyboard and then walk away, leaving the kiosk is a wait state that it will not recover from. The timeout condition 902 forces the kiosk back into the Idle state if enough time has passed since the last user event 908 took place. This way, the kiosk is not inadvertently taken out of service for long periods of time.

Each of the three pay for services have a common feature at the beginning. Each requires that the customer's payment card has been captured and validated before allowing the customer to proceed with the service selected. Before moving into a more detailed description of each service, the payment card capture process with be described.

Payment card capture for the video phone kiosk 100, involves determining whether or not the card proffered is one that can be used to pay for the requested service and to set payment limit that guarantees the transaction will be covered with the funds from the card. There are a number of electronic forms of payment that can be applied to the video phone kiosk, such as credit cards MasterCard®, VISA®, AMEX®, and Discover®, to name a few, debit cards that are attached to credit networks such as Mastercard® and VISA®, stand alone debit cards, gift cards, and pre-pay cards. The previous list is by no means exhaustive, but is comprehensive enough that the video phone kiosks 100 that are targeted to specific demographics where one or more forms of electronic payment predominate do not exclude the video phone kiosk 100 from providing services to that demographic. The customer seeking the selected service will be asked to present one of the aforementioned payment options 1002 (FIG. 10) in order to get the service started. The customer may be presented with something as simple as a text based request screen, or it can take the form of something very graphical as the payment processing devices at retail and grocery stores that present graphical representations of payment cards or logos of specific electronic payment options and services. Each type of electronic payment begins with the reading of a magnetic stripe card 1006. While any magnetic striped card with the proper dimensions and stripe placement can fit into the card reader, only those that adhere to a predetermined data storage standard for financial transactions, for example, ISO 7810, 7812, 7813 and ISO 4909, will have the most success at being read.

Once the magnetic stripe card has been read, the customer application has to determine if this is the type of card that it can use to post a financial charge to the attached merchant account 1010. If it is, then the card data is captured to the merchant account for the amount of the service, or a pending minimum amount 1014. Once the merchant account has verified the transaction as good 1018, then the customer application is given a financial transaction limit to monitor on the payment card 1022. If the limits do not exceed the financial value left on the payment card, in the case of debit, gift, pre-pay cards, or credit limit in the case of network cards such as Mastercard®, VISA®, AMEX® and Discover® 1024, then the process will return to caller, in this case, one of the three pay for services selected.

If the payment card presented is not a card type that can be processed 1010, then the customer application will inform the customer 1008 that the card presented is one the application cannot use. At this point, the customer is given the choice to present another card or type of card to complete the pending service request or they can cancel it all together 1000. It is important to note here that a customer can cause the video phone kiosk 100 to suspend operations because they can continually insert the same "bad" card, or a series of "bad" cards in the hopes of bypassing the payment request. Also, if the customer abandon's the kiosk in the middle of the transaction request, the video phone kiosk 100 could be made to wait "forever" for the interaction to continue. For these operational reasons and to keep the kiosk from pausing for extended periods of time, two event managers handle these possibilities. The first is a timeout sequence is attached to this process, so that if the customer abandons the video phone kiosk in the middle satisfying the payment request, that after a predetermined interval of inactivity, the process will automatically kill the pending transaction, set the bad transaction flag 1018 and return back to 916 for top level processing.

The second event manager is a retry limiter. Each time the customer uses a payment card to address the payment request, the retry counter will decrement towards zero. Once the customer has used up the predetermined number of retries allowed 1004, then the process will inform the customer that it cannot process their request 1012, as the payment card(s) presented could not be used with the attached merchant account to complete the transaction. The customer application will then kill the pending transaction, set the bad transaction flag 1016 and return to 916 for top level processing.

Moving on to the Greeting Card process loop (ref. FIG. 14), the customer application will check to see if the payment card has been captured 1400. If not, then the customer application will attempt to capture the card information (as described previously) before displaying the Greeting Card application, otherwise the Greeting Card application is displayed to the customer.

The Greeting Card application is a bit different than the other two services, video phone call and video mail. The reason for this, is that the customer will not actually create a real greeting card they will pull from the video phone kiosk 100, but instead, will specify what it will eventually become. A fulfillment house will receive the paid request and actually create and mail the physical card to the recipient.

When the application is displayed, the customer is asked to position themselves in front of the camera and to press the spacebar or touch a hot spot on the touch screen when their picture, as composed on the screen, looks the way they like. If the picture did not turn out to the customer's satisfaction, then they have the opportunity to retake the picture up to several times to "get it right" before moving on to the card stock. Besides the use of the touch screen or the keyboard the customer can select the use of a timer, so they can stand away from the video phone kiosk 100 to either crop the picture smaller, or pose in a way that is prevented by standing close enough to touch the keyboard or the screen.

Once the picture has been taken, the customer is given the choice of what kind of greeting card they wish to use. Again, the customer is presented with a number of options that are monitored with event managers to prevent stalling the machine due to incorrect input, indecisiveness on the part of the customer, or the customer abandons the kiosk entirely. The card stock itself is presented as a scaled image of the actual card that the user can select from a graphical list. A description of the card stock, type of paper, physical size, price, and any provided prose will be listed as part of the selection process. The customer can navigate this list from end to end using the touch screen, the keyboard or the mouse. For video phone kiosks 100 that contain a large number of choices the card stock list will be broken up into logical categories that the customer can select first to narrow the options to a manageable level.

Once the customer has selected the type of card they wish to use, the application presents them with an opportunity to select and/or create prose to go on the card. If the customer selects to create prose for the card, then the application will ask the customer to use the keyboard to enter in what they wish to say. Again as before, event managers will manage this entry portion of the application to prevent stalling due to abandonment and/or malformed or bad data entry.

Next, the customer can select from a number of scents in order to perfume the card and envelope for the recipient.

Lastly, the customer is prompted for the recipient's mailing address, and if the customer desires, their sending address (typically a home or work address). The sending address can be any address the customer wishes to provide. Normally, an application like this will focus on the local geographic region it is designed to service, so mailing addresses will assume to follow local post office addressing conventions. The Greeting Card application will allow for addressing to be sent anywhere in the world there is a postal service and addressing that is recognized by the United States Postal Service (USPS). Charges for international mail will be charged to the customer's payment card from an internally stored rate table that is derived from the USPS.

Once the recipients address has been acquired, the customer is asked if they are ready to send their card 1408. If they do not wish to send the card, then the customer application abandons the greeting card, plus its information and returns back to 916 for top level menu processing.

If the customer does wish to send the card then the application checks the transaction limits to make sure they have not been exceeded. If they have not, then the application will process the payment prior to sending the card. For the condition where the transaction limits have been exceeded, the application will alert the customer that the cost of the card is more than they have payment ready for, and they will need to either reduce the number of items they want to use on the card (like scent), select a less expensive card, or cancel the transaction. If the customer cancels the transaction, then the greeting card and payment transaction are abandoned and control is returned to 916 for top level processing. If the customer wishes to rearrange the greeting card to fit the available charge limit, then the application will allow them to make changes to reduce the costs.

Once the payment is processed, the application combines the information it as gleaned from the customer into an e-mail that is sent to a fulfillment center for processing 1406. The fulfillment center will print the prose and color image on the card, plus apply any scent to both the card and the envelope, print the mailing address, and mail the card out to the recipient.

Only one greeting card can be created at a time; however, once the first card has been created, the customer will be given the choice create another card 1412 and to recycle previous information and images from the first card. For example, a customer desires to create Mother's Day cards for their mother, their spouse's mother, the couple's respective grandmothers, and the customer's sister. After creating the first card with an image grab of the customer and their spouse, the customer can choice to use that photograph, any prose selected or created, scent, and that card stock to create multiple cards that are personalized to each individual receiving one. The application "remembers" the last set of choices for the customer during the greeting card application session. Once the customer leaves the application for another service or to quit, the greeting card application "forgets" the information it received from the customer.

When video mail is selected (ref. FIG. 13) from the top level process loop, control passes to 1300 where the customer application checks to see if there is a captured payment card. If not, then control passes to 1002 where the payment card is captured prior displaying the video mail application 1302. If the card has been captured, then the customer application goes right to the video mail application and displays it.

The video mail application is rather simplistic compared to the other services, as the options are few. To create the video mail 1304, the customer is asked for the e-mail address(es) of the recipient(s). For the initial embodiment, the customer application will require that the customer enter in the e-mail addresses through the keyboard or by using the touch screen. Later embodiments will use flash drives, jump drives and other kinds of portable media to pull in an address book and allow the customer to select from the list of recipients.

Once the recipients have been entered, the customer is asked to adjust themselves in front of the camera and to press the record button on the touch screen, or a pre-defined key on the key board to start the recording. First embodiment of the recording does nothing to embellish the environment around the customer. The recipient will see the customer and a portion of the environment where they stood to make the recording. A preferred embodiment will allow for a screen or projection treatment background that "places" the user in some location they can select (Hawaii, Paris, London, Mountains, Ocean, etc.). The background will be provided by a number of means including: A) a physical back drop behind the customer; B) a flat screen that displays a still or moving image behind the customer; C) a reflective surface behind the customer that reflects a projected still or moving image or; D) a chroma key backdrop behind the user that is combined with a still or moving image the user selects to replace that color in the final rendering. Early embodiments will provide the "environments" the customer can select from. Later improvements will allow the customer to provide their own still and moving images to create their "environment" to be used with the video mail.

When the recording is finished, the customer is given the option to review the recording to see if they like the results. If they want to record it again, the application will let them redo the video mail up to a predetermined number of times before cutting off the re-do's. This prevents the customer from monopolizing the video phone kiosk 100, especially in high traffic and busy areas.

If the customer likes the recording, they are given the option to send it or quit. If they choose to quit, then control passes to 916 for top level processing, otherwise the cost of the video mail is checked against the transaction limits 1310. If the transaction limits are exceeded, then the customer is given the option to reduce the cost of the video mail or quit. If they chose to quit, then control is passed back to 916 for top level processing, otherwise control is passed back to 1304 where the customer can create a less expensive video mail.

If the transaction limits are not exceeded, then the application applies the charges to the merchant account/bank for the payment card 1800 (ref. FIG. 18), and the video mail is sent to the designated recipient(s) 1306. The customer is given the opportunity to create another video mail 1312. If they choose to do so, then control is passed back to 1304, otherwise control is passed back to 916 for top level processing.

Payment card processing is handled in a straight forward manner by the customer application. When the customer application needs to process an actual payment to the merchant account/bank, then control is passed to 1800 which contacts the electronic merchant account interface and posts the transaction for clearance. It should be noted, that prior to processing a payment card of any type, the payment card needs to be captured, otherwise there is insufficient information to clear a transaction and the posting will fail every time.

Once the payment is posted and cleared, the customer is then asked if they want to receive a receipt by e-mail or by fax. If the customer chooses to receive their receipt by fax, then the customer is asked for the fax number to deliver the fax to. It should be noted at this point that fax delivery is limited to certain geographies due to the service coverage. The customer's fax number is checked against the provided coverage area, and if there is a problem, they will be offered delivery of receipt by e-mail. If the fax number is within the coverage area, then the receipt is faxed right then so the customer can "see" the fax being delivered. Once the fax is delivered, the application returns to caller.

If the customer chooses initially to deliver their receipt by e-mail, the application will ask for a valid e-mail address and deliver the receipt to that e-mail address before returning to caller. It should be noted that is all cases, e-mail receipts are automatically generated to a company e-mail address where these copies are held for audit and in case the customer did not receive their receipt, they can contact customer support and receive a copy of their transaction.

When video call is selected from the top level process loop, control passes to 1212 (FIG. 12) where the customer application checks to see if there is a captured payment card. If not, then control passes to 1002 where the payment card is captured prior displaying the video call application 1200. If the card has been captured, then the customer application goes right to the video call application and displays it 1200.

The video call application provides a simple set of features designed to support both the causal and the business customer. Of note, the video call application will allow video optional calls, audio only calls, SS7 signaling support, 3-way calling, plus simple video and/or audio conferencing up to 6 people—depending on the bandwidth and phone features designated for the particular video phone kiosk 100 in question. Early embodiments do not have a phone directory, but later feature enhancements will include the ability for a customer to insert some form of mobile media, (jump drive, flash drive, flash cards, CD-ROM, etc) and import their phone directory for use during that video phone session. Future enhancements will also include a localized phone directory for both business and residential listings, so a customer does not have to find a phone book, or leave the application to get a phone number.

Once the video phone application is displayed, the customer is asked for the phone number they wish to dial 1202. Once the phone number is acquired from the customer, the phone number is run against the rate table for pricing 1100 (ref. FIG. 11).

To accomplish this, the rate table is read 1100 in from the rate table 1102 stored internal to the video phone kiosk 100. Next the phone number provided is decomposed into country code (if applicable), area/region code, NPA-NXX (if US/Canada number). US/Canada rate tables are typically priced on area code boundaries and city populations within those area codes. For example, a tier 1 city is typically a city or location with 100,000 or more residents and typically has a profession sports team such as NFL, NBA. International rates are queued based on the type of service (cell, landline, etc.) and the region code. The provided phone number is compared 1104 against the rate table for a matching entry. If there is a match, then the rate is considered valid 1106 and control passes to 1206 to check for a good transaction, otherwise the bad transaction flag gets set and the control passes to 1206.

If the phone number could not be rated and thus triggered a bad transaction, the customer is informed that the video phone kiosk 100 cannot dial the phone number provided, and gives then the option to enter a new one or quit. If the customer chooses to quit, then control passes to 916 for top level processing. If the customer chooses to enter a new phone number, the control passes back to 1202 to acquire a new phone number.

If the phone number is rated, then the video call software makes the phone call 1204 and connects the customer to the receiving party. Once the call starts, a parallel process accumulates per minutes charges on a timer 1214. The accumulated charges are compared against the transaction limits 1210 for the payment card at the same time. As the charges get within an estimated 3 minutes of transaction limits charges, the video call is interrupted with an audio message informing the customer that they need to end the call as the available funds will not permit the call to continue for more than 2 more minutes. The warning is repeated a 2 minutes left, then 1:30, before shutting off the phone call with 1 minute remaining against the transaction limit.

Once the phone call is terminated, the charges are posted against the merchant account 1800 (FIG. 18), and the customer application turns control back over to 916 for top level processing. If the transaction limits have not been reached, then the customer is given the opportunity to make another call against the current billing. If the customer chooses to do so, then the video phone application cycles back to 1202 (FIG. 12) to ask for a new number to dial and loops from there, otherwise, any outstanding charges are posted against the merchant account and control turns back over to 916 for top level processing.

It should be noted that, as previously mentioned, customer interactions with a kiosk can be via many modes such as a keypad, mouse, touch screen, voice recognition, etc.

Figure 25:
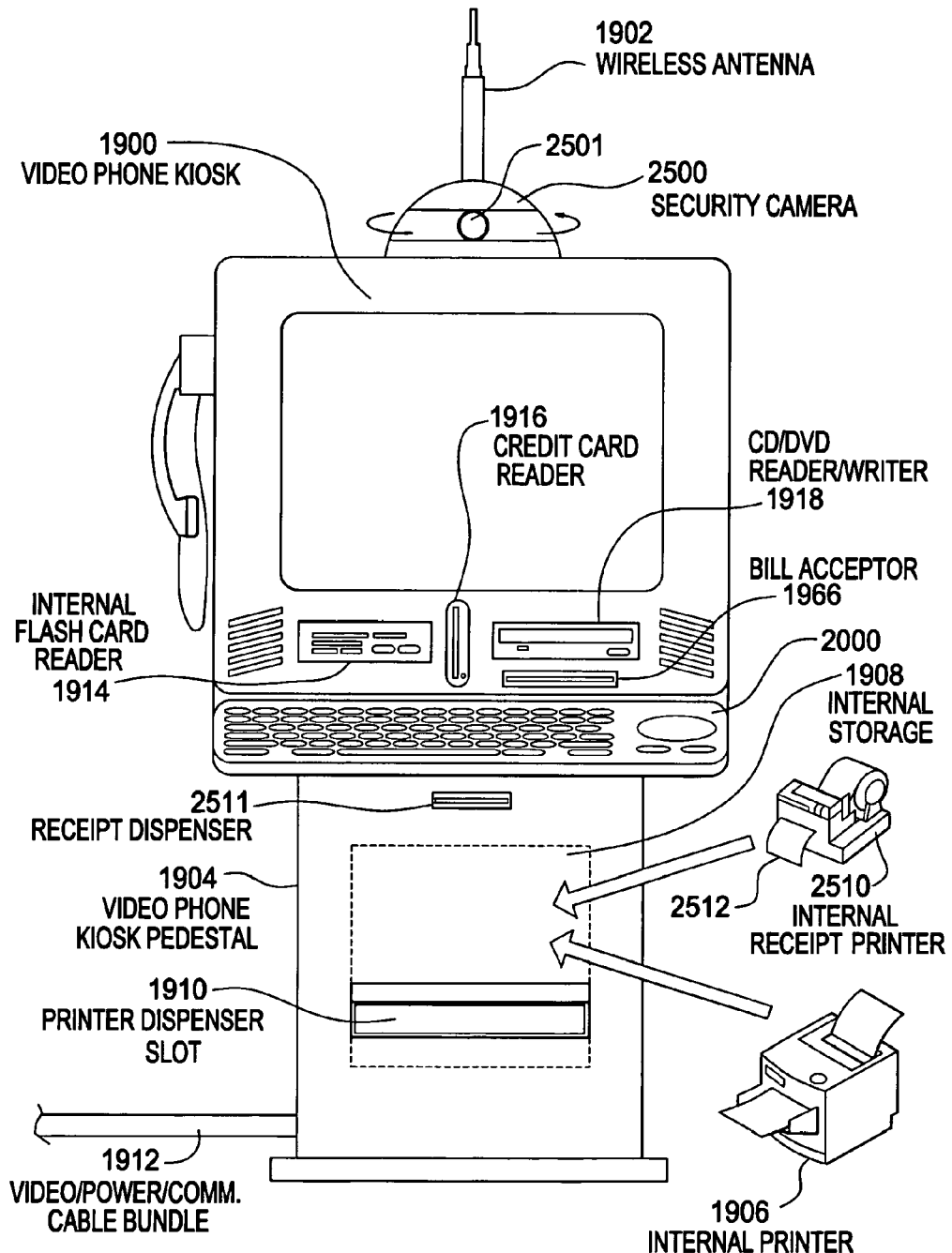
FIG. 25 is a first front elevation view of an alternative embodiment video phone kiosk with a security camera.
Figure 26:
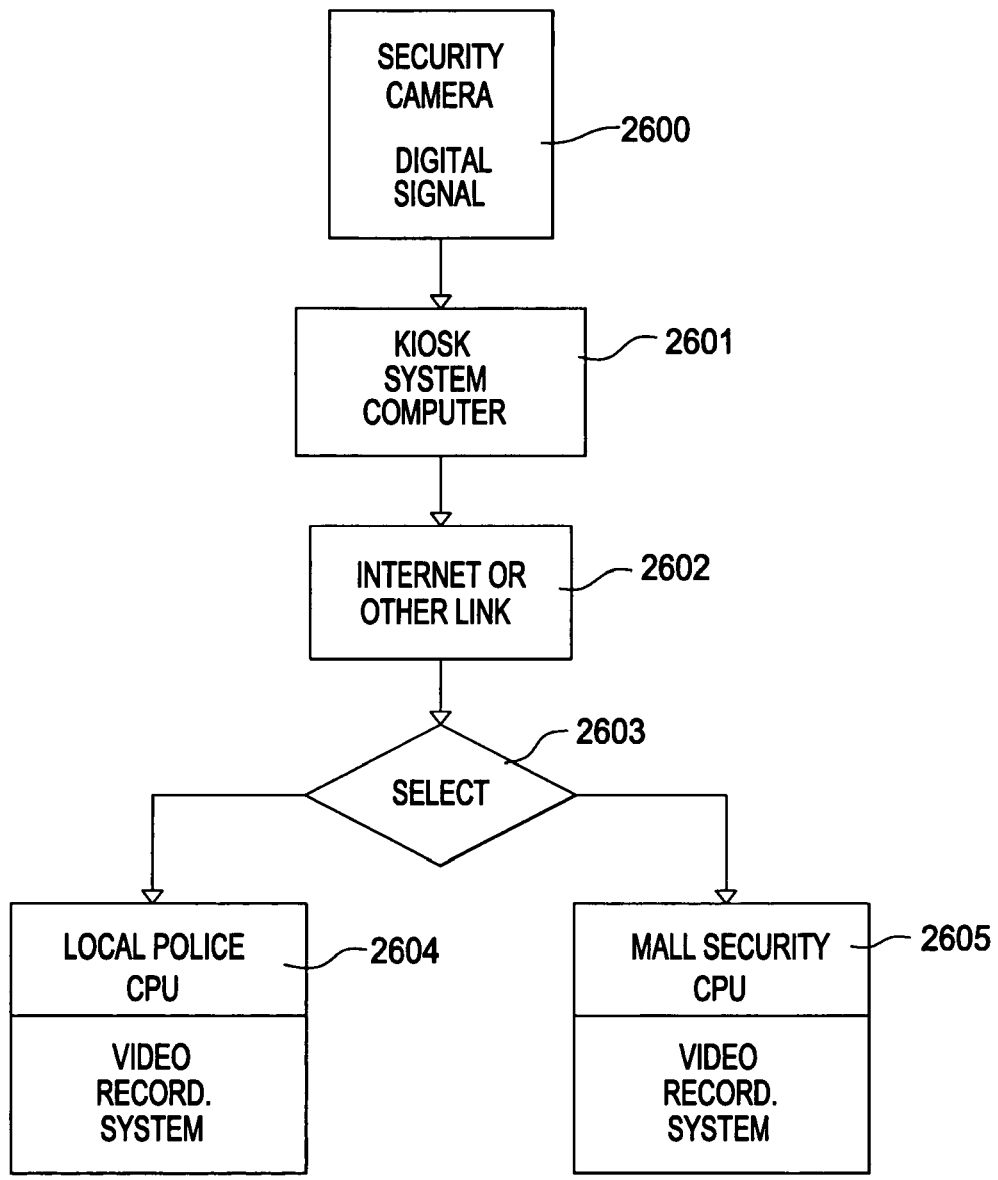
FIG. 26 is a flow chart of the security camera option.

Referring next to FIGS. 25, 26 a video phone kiosk 1900 has optional features including a security camera 2500 which can pan the surroundings using a revolving camera 2501.

An internal receipt printer 2510 can provide transaction receipts 2512 out the receipt dispenser 2511. The biometric keyboard 2000 is integral with the video phone kiosk pedestal 1904 to prevent theft. The mouse functions are done on the keyboard 2000 to prevent theft of a mouse. The bill acceptor 1966 can be used to pay for calls.

The flowchart (FIG. 26) shows the security camera signal 2600 sent to the kiosk computer(s) 2601 which could have security software for fast movement or weapon identification. A select command 2603 sends the video digital signal to a selected site such as a police computer 2604 and/or a mall security computer 2605. Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A senior citizen video phone kiosk comprising:
   a system computer controlling a touch screen, a credit card reader, and a voice and video over internet communications (VoIP) communication module;
   a video phone call module comprising a connection to the VoIP communication module, a pre-selected photo album, and a pre-selected audio greeting; and
   a guardian controlled database including emergency contacts, call circle, and a credit limit, said database accessible by the system computer.

2. A kiosk comprising:
   a system computer controlling a video phone, a touch screen, a voice recognition module, a credit card reader, and a voice and video over internet communications (VoIP) communication module;
   said video phone having a camera with a field of vision capable of capturing video of a user seated in front of the kiosk as well as an area adjacent to a user;
   a video phone call module comprising a connection to the VoIP communication module, a pre-selected photo album, and a pre-selected audio greeting;
   a personalized profile for creating and managing membership data in a guardian controlled database comprising emergency contacts, a call circle, and a credit limit, the guardian controlled database stored in memory communicatively coupled to the system computer;
   the kiosk having a configuration compatible for operational access and use by a user confined to a wheel chair or mobile cart.

3. The kiosk of claim 2 wherein the personalized profile comprises a user's name and contact information, a photo of at least one contact person, a physical address of the at least one contact person, and an email address of the at least one contact person.

4. The kiosk of claim 2 further comprising an enclosure panel having an exterior segment with advertising, said advertising having a video spooling of content.

5. A method comprising the steps of:
   creating a personalized profile for a first individual by supplying personal identification information related to the first individual;
   storing the personalized profile of the first individual in a membership database hosted on a storage device;
   creating a calling circle for the first individual by identifying one or more calling circle members, creating a profile for each of the one or more calling circle members comprising a photograph of and contact information for each of the one or more calling circle members, and storing the profile for each of the one or more calling circle members in the membership database hosted on the storage device, said calling circle for the first individual being linked to the personalized profile of the first individual;
   utilizing a kiosk to send a message to one or more members of the calling circle for the first individual by accessing the personalized profile related to the first individual in the membership database, viewing the photographs of the one or more members of the calling circle on a touch screen, selecting a first member of the calling circle by either touching a photograph of the first member on the screen, utilizing a pointing device to select a photograph of the first member on the screen, or though voice recognition indicating a unique identifier associated with a photograph the first member on the screen, said selection causing a phone call to be made to or a message to be sent to the first selected member of the calling circle.

6. The method of claim 5 wherein the kiosk comprises a system computer controlling a video phone, the touch screen, a voice recognition module, a credit card reader, and a voice and video over internet communications (VoIP) communication module;
   said video phone having a camera with a field of vision capable of capturing video of a user seated in front of the kiosk as well as an area adjacent a user;
   a video phone call module comprising a connection to the VoIP communication module, a pre-selected photo album, and a pre-selected audio greeting;
   a personalized profile for creating and managing membership data in a guardian controlled database comprising emergency contacts, a call circle, and a credit limit, the guardian controlled database stored in memory communicatively coupled to the system computer;
   the kiosk having a configuration compatible for operational access and use by a user confined to a wheel chair or mobile cart.

7. The method of claim 5 wherein the message is video mail.

8. The method of claim 5 wherein the message is a greeting card.

9. The method of claim 8 further comprising the step of selecting a scent to be applied to the greeting card.

10. The method of claim 5 wherein the message is an audio or video phone call.

11. The method of claim 5 wherein the personalized profile is accessed using a magnetic stripe card.

12. The method of claim 5 further comprising the steps of modifying the personal profile and storing the modified information in the membership database.

13. The method of claim 5 further comprising the steps of:
    utilizing the kiosk to photograph the first individual, resulting in a photograph of the first individual; and
    storing the photograph of the first individual in the membership database and linking it to the personal information.

14. The method of claim 5 further comprising the steps of:
    utilizing the kiosk to photograph one or more calling circle members, resulting in one or more photographs of the one or more calling circle members; and
    storing the one or more photographs of the one or more calling circle members in the membership database and linking it to the personal information and the profile of a respective one or more calling circle members.

15. The method of claim 5 wherein the membership database is a guardian controlled database.

16. The method of claim 15 further comprising the step of supplying funds into an account associated with a personalized profile for a first individual and modifying and tracking the funds by accessing the membership database.

* * * * *